US008681735B2

(12) United States Patent
Mizukoshi et al.

(10) Patent No.: US 8,681,735 B2
(45) Date of Patent: Mar. 25, 2014

(54) WIRELESS COMMUNICATIONS SYSTEM FOR CONTROLLING COMMUNICATION PATH

(75) Inventors: Yasuhiro Mizukoshi, Tokyo (JP); Sadao Kimura, Tokyo (JP); Hideki Kurokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1781 days.

(21) Appl. No.: 11/681,842

(22) Filed: Mar. 5, 2007

(65) Prior Publication Data

US 2007/0206538 A1    Sep. 6, 2007

(30) Foreign Application Priority Data

Mar. 3, 2006   (JP) .................................. 2006-057754

(51) Int. Cl.
*H04W 4/00*     (2009.01)
*H04L 12/28*    (2006.01)
*H04L 12/56*    (2011.01)
*H04W 36/00*    (2009.01)

(52) U.S. Cl.
USPC ............ 370/331; 370/351; 370/400; 455/436

(58) Field of Classification Search
USPC .............. 370/237–238.1, 331, 392, 393, 401, 370/409; 455/436–445
See application file for complete search history.

(56) References Cited

U.S. PATENT DOCUMENTS

| | | | | |
|---|---|---|---|---|
| 5,325,362 A | * | 6/1994 | Aziz | 370/405 |
| 5,708,654 A | * | 1/1998 | Arndt et al. | 370/242 |
| 6,233,458 B1 | * | 5/2001 | Haumont et al. | 455/445 |
| 6,654,359 B1 | * | 11/2003 | La Porta et al. | 370/328 |
| 6,842,462 B1 | * | 1/2005 | Ramjee et al. | 370/466 |
| 6,947,401 B2 | * | 9/2005 | El-Malki et al. | 370/331 |
| 6,980,802 B2 | * | 12/2005 | Jung | 455/436 |
| 6,987,771 B2 | * | 1/2006 | Shimizu et al. | 370/401 |
| 7,116,654 B2 | * | 10/2006 | Kim | 370/338 |
| 7,286,520 B2 | * | 10/2007 | Takeda et al. | 370/349 |
| 7,298,720 B2 | * | 11/2007 | Yamada et al. | 370/331 |

(Continued)

FOREIGN PATENT DOCUMENTS

| | | |
|---|---|---|
| CN | 1588910 A | 3/2005 |
| EP | 1 335 539 A1 | 8/2003 |

(Continued)

OTHER PUBLICATIONS

Perkins, Charles & Johnson, David, "Route Optimization for Mobile IP", Cluster Computing, vol. 1, No. 2, Jun. 1998, pp. 161-176.*

(Continued)

*Primary Examiner* — Ariel Balaoing
*Assistant Examiner* — Larry Sternbane
(74) *Attorney, Agent, or Firm* — Sughrue Mion, PLLC

(57) ABSTRACT

A controller manages a connection of a wireless terminal to a wireless base station, and provides a source base station with information for connecting the wireless terminal by way of an anchor when the wireless terminal moves between wireless base stations. When devices on both sides of an anchor connected communication are wireless terminals connected to wireless base stations in said same wireless communications system, a wireless base station device switches a path such that data is transmitted/received between the wireless base stations to which the wireless terminals are connected on both sides of the anchor connected communication without intervention of the anchor.

27 Claims, 20 Drawing Sheets

(56) References Cited

U.S. PATENT DOCUMENTS

| | | | |
|---|---|---|---|
| 7,333,482 B2* | 2/2008 | Johansson et al. | 370/353 |
| 7,353,027 B2* | 4/2008 | Karagiannis et al. | 455/436 |
| 7,593,377 B2* | 9/2009 | Thubert et al. | 370/338 |
| 7,676,223 B2* | 3/2010 | Das et al. | 455/422.1 |
| 7,787,414 B2* | 8/2010 | Le Faucheur et al. | 370/328 |
| 2004/0097232 A1* | 5/2004 | Haverinen | 455/436 |
| 2004/0160941 A1 | 8/2004 | Suh et al. | |
| 2006/0018291 A1* | 1/2006 | Patel et al. | 370/335 |
| 2007/0005971 A1* | 1/2007 | Leung et al. | 713/171 |

FOREIGN PATENT DOCUMENTS

| | | |
|---|---|---|
| JP | 7-131459 A | 5/1995 |
| JP | 9-214516 A | 8/1997 |
| JP | 2001-339752 A | 12/2001 |
| JP | 2003-318956 A | 11/2003 |
| JP | 2004-328223 A | 11/2004 |
| JP | 2005-533458 A | 11/2005 |
| WO | 03/034683 A1 | 4/2003 |

OTHER PUBLICATIONS

English Translation of Japanese Patent Application 2003-118499 (Publication 2004-328223 dated Nov. 18, 2004), Matsuki, et al. (Applicant provided English Abstract for this application on the IDS filed Mar. 5, 2007).*

Office Action dated Dec. 27, 2010, issued in corresponding Chinese Application No. 200710085432.7.

H. Soliman, et al. "Hierarchical Mobile IPv6 Mobility Management (HMIPv6)", IETF Standard, Internet Engineering Task Force, Aug. 2005, pp. 1-29.

G. Dommety, et al. "Fast Handovers for Mobile IPv6", Internet Citation: URL: http://www.mcl.hu/micromob/downl...-lett-mobileip-last-mipv6-0, 2001, pp. 1-57.

* cited by examiner

WIRELESS COMMUNICATIONS SYSTEM FOR CONTROLLING COMMUNICATION PATH

This application is based upon and claims the benefit of priority from Japanese Patent Application No. 2006-057754 filed on Mar. 3, 2006, the content of which is incorporated by reference.

BACKGROUND OF THE INVENTION

1. Field of the Invention

The present invention relates to a wireless communications system which has wireless base stations and a wireless communication controller, and more particularly, to control of a communication path in a wireless communications system.

2. Description of the Related Art

In recent years, wireless LAN has been increasingly introduced as intranet environment. A general wireless communications system such as the wireless LAN comprises wireless base stations and a wireless communication controller. A plurality of the wireless base stations are dispersed to cover an intended area in which the wireless LAN can be utilized. Then, the wireless communication controller controls the plurality of wireless base stations.

FIG. 1 is a block diagram illustrating the configuration of a conventional radio communications system. This is a general traffic concentrated wireless communications system.

Referring to FIG. 1, this wireless communications system comprises wireless communication controller (controller: CTRL) 901, and a plurality of wireless base stations (access points: AP) 902-904. APs 902, 903 are connected to the same sub-net, while AP 904 alone is connected to another sub-net beyond router (R) 907.

APs 902-904 can accommodate wireless mobile terminals (ST) 905, 906 through wireless channels. STs 905, 906 are connected to a wired LAN through associated APs 902-904.

CTRL 901 intensively controls APs 902-904, including connections of STs 905, 906 to APs 902-904 and movements of STs 905, 906 among APs 902-904, and routing of all paths through APs 902-904. Since this system is traffic concentrated, all traffic of APs 902-904 is transferred through CTRL 901.

As another conventional wireless communications system, a system having a routing function provided in each AP has been proposed for reducing a load on CTRL.

FIG. 2 is a block diagram illustrating the configuration of another conventional wireless communications system. Unlike the one illustrated in FIG. 1, this is a traffic distributed wireless communications system.

Referring to FIG. 2, this wireless communications system comprises CTRL 911 and a plurality of APs 912-914, as is the case with the one illustrated in FIG. 1. APs 912, 913 are connected to the same sub-net, while AP 914 alone is connected to another sub-net beyond router 907.

APs 912-914 can accommodate STs 915, 916 over the air. STs 915, 916 are connected to a wired LAN through associated APs 912-914. APs 912-914 have a routing function, unlike APs 902-904 in FIG. 1. APs 912-914 can directly exchange data without intervention of CTRL 911.

CTRL 911 intensively controls APs 912-914, including connections of STs 915, 916 to APs 912-914, and movements of STs 915, 916 among APs 912-914. However, since each of APs 912-914 has the routing function, CTRL 911 need not transfer packets among APs.

Further, as a yet another conventional wireless communications system, there has been proposed a system in which AP functions as an anchor such that a communication can be continued even if ST moves between different sub-nets (see, for example, JP-A-2003-318956 (pages 2-4, FIGS. 3, 4)).

FIG. 3 is a block diagram illustrating the configuration of a yet another conventional wireless communications system. Like the one illustrated in FIG. 2, this is a traffic distributed system, where one AP functions as an anchor for movements of ST.

Referring to FIG. 3, this wireless communications system comprises CTRL 921 and a plurality of APs 922-924, as is the case with the one illustrated in FIG. 1. APs 922, 923 are connected to the same sub-net, while AP 924 alone is connected to another sub-net beyond router (R) 927.

APs 922-924 can accommodate STs 925, 926 over the air. STs 925, 926 are connected to a wired LAN through associated APs 922-924. Unlike APs 902-904 in FIG. 1, APs 922-924 have a routing function. AP 922 and AP 923 within the same sub-net can exchange data without intervention of CTRL 921.

When ST 926 moves from AP 923 to AP 924 connected to another sub-net beyond router (R) 927, AP 923 serves as an anchor to relay data without making ST 925 conscious that ST 926 has moved. In this event, AP 923 is newly connected to ST 926 through AP 924 while leaving a path between AP 923 and ST 925 through AP 922. Then, AP 923 relays a communication between ST 925 connected through AP 922 and ST 926 connected through AP 924.

CTRL 921 intensively manages APs 922-924, including connections of ST 925, 926 to APs 922-924, and movements of STs 925, 926 among APs 922-924. However, since each of APs 922-924 has the routing function, CTRL 921 need not transfers packets among subordinate APs.

However, the foregoing related art has problems as shown below.

In the conventional example of FIG. 1, since a traffic load concentrates on CTRL 901, CTRL 901 forms a bottleneck to limit the number of STs 905, 906 which can be accommodated in the system.

In the conventional example of FIG. 2, although CTRL 911 is alleviated a traffic load concentrated thereon, communications cannot be continued when STs 915, 916 move beyond router 917.

In the conventional example of FIG. 3, while ST can move beyond router 927, a communication path runs by way of an anchor, and therefore becomes longer to increase a delay in some cases. Also, AP 923 is burdened with a higher load when it serves as an anchor.

SUMMARY OF THE INVENTION

It is an object of the present invention to provide a wireless communications system which permits ST to continue a communication even if the ST moves, prevents a concentrated traffic load, and alleviates an increase in delay.

To achieve the above object, a wireless communications system of the present invention has a plurality of wireless base stations located such that a mobile wireless terminal can be connected thereto, wherein the wireless terminal is allowed to continue a communication when the wireless terminal moves between wireless base stations by transmitting/receiving data between a source base station which assumes a position of an anchor and a destination base station. The system includes a controller and a plurality of wireless base station devices.

The controller manages a connection of the wireless terminal to a wireless base station, and provides a source base station with information for connecting the wireless terminal by way of the anchor when the wireless terminal moves between wireless base stations. The plurality of wireless base station devices each switch a path such that data is transmitted/received between wireless base stations to which wireless terminals are connected on both sides of an anchor connected communication without intervention of the anchor.

The above and other objects, features, and advantages of the present invention will become apparent from the following description with references to the accompanying drawings which illustrate examples of the present invention.

DETAILED DESCRIPTION OF THE PREFERRED EMBODIMENTS

Modes for implementing the present invention will be described in detail with reference to the drawings.

(First Embodiment)

Figure 1:
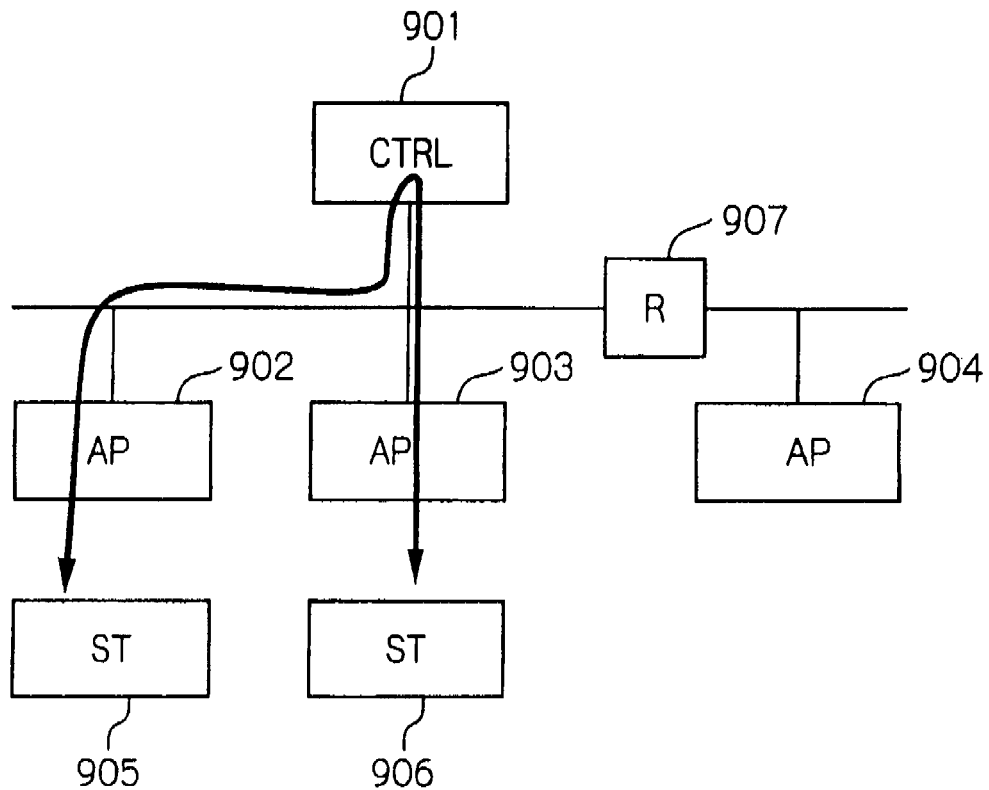
FIG. 1 is a block diagram illustrating the configuration of a conventional wireless communications system.
Figure 2:
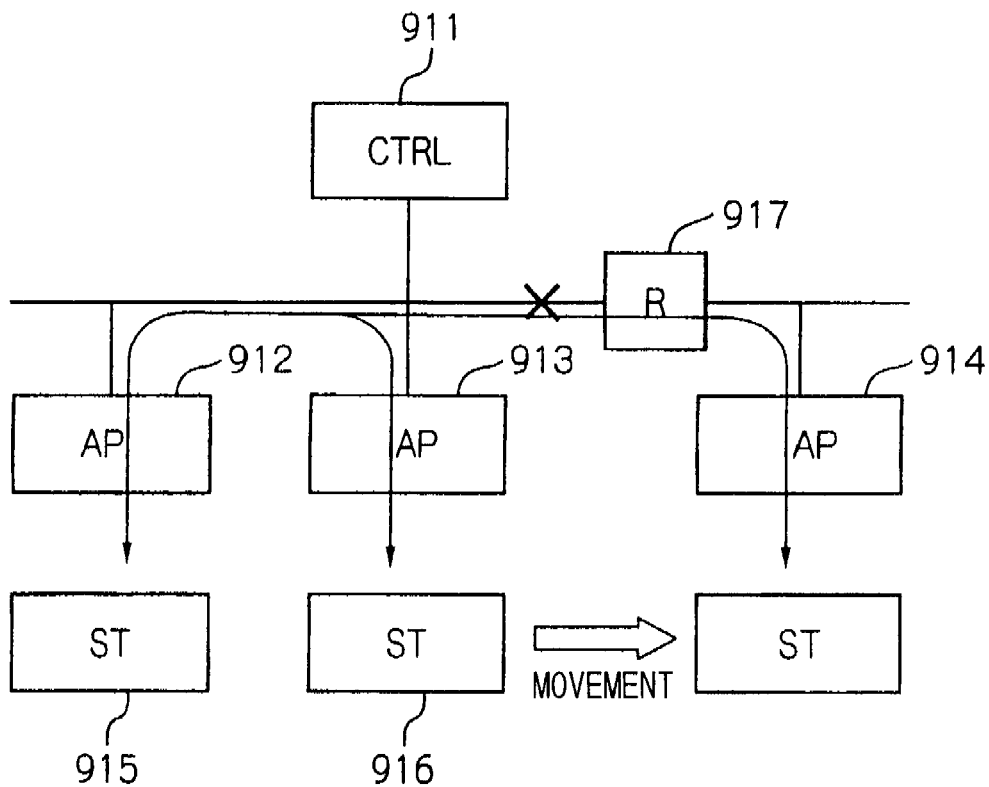
FIG. 2 is a block diagram illustrating the configuration of another conventional wireless communications system.
Figure 3:
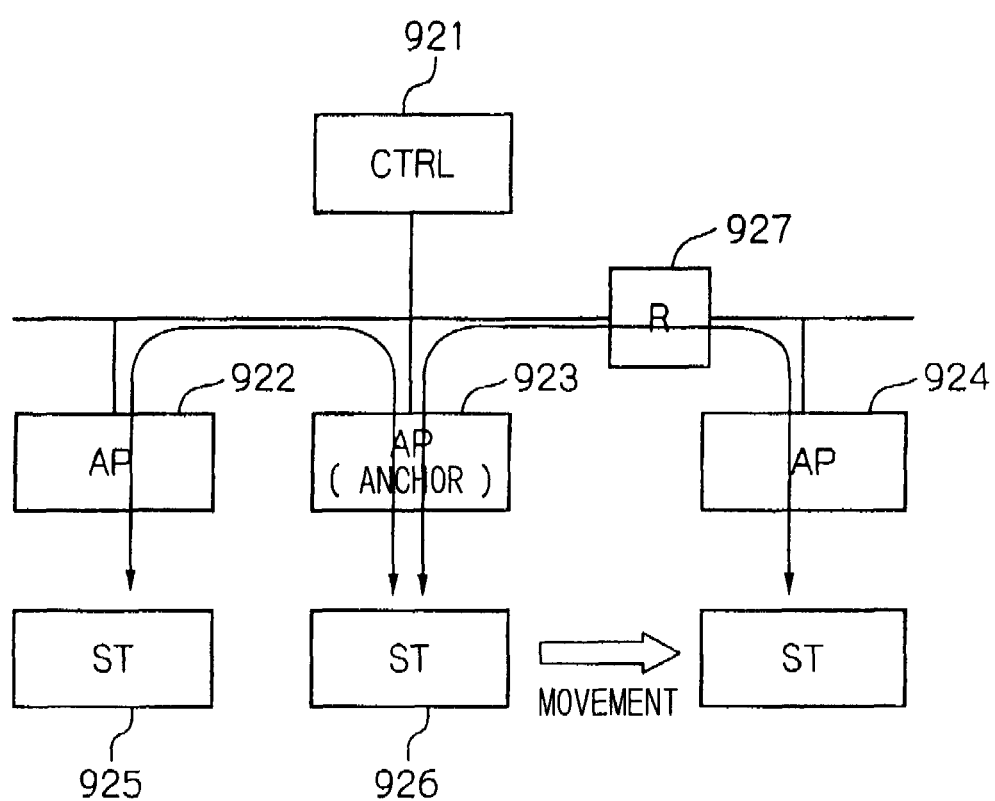
FIG. 3 is a block diagram illustrating the configuration of a yet another conventional wireless communications system.
Figure 4:
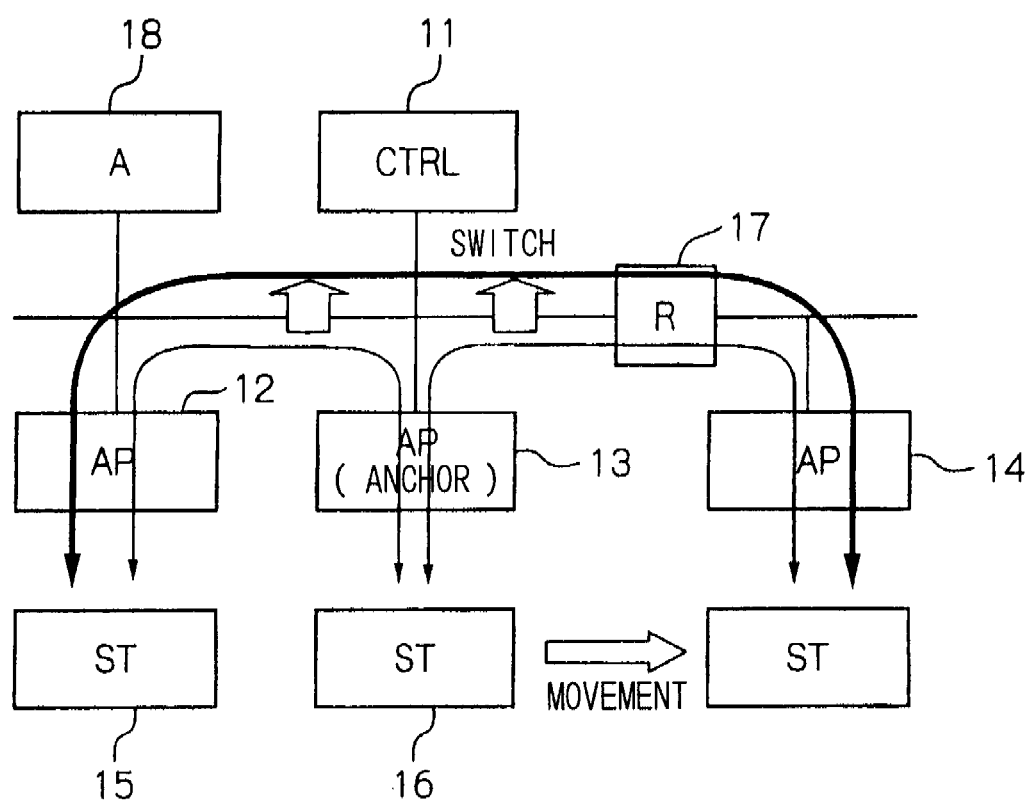
FIG. 4 is a block diagram illustrating the configuration of a wireless communications system according to a first embodiment.

FIG. 4 is a block diagram illustrating the configuration of a wireless communications system according to a first embodiment. Referring to FIG. 4, the wireless communications system of this embodiment comprises wireless communication controller (controller: CTRL) 11, and a plurality of wireless base stations (access points: AP) 12-14. In the example of FIG. 4, APs 12, 13 are connected to the same sub-net, while AP 14 alone is connected to another sub-net beyond router (R) 17. CTRL 11 and another communications device (A) 18 are connected to the same sub-net as APs 12, 13. Communications device (A) 18 is, for example, a server.

APs 12-14 can accommodate wireless mobile terminals (ST) 15, 16 through wireless channels. STs 15, 16 are connected to wired LAN through associated APs 12-14. This wireless communications system is of a traffic distributed type, where APs 12-14 can directly exchange data without intervention of CTRL 11. Also, in this wireless communications system, APs 12-14 can temporarily function as an anchor, so that STs 15, 16 can continue communications even if they move to another sub-net beyond router 17.

For example, consider that ST 16 moves to AP 14 from a state in which a communication has been made between ST 15 connected to AP 12 and ST 16 connected to AP 13. In this event, AP 13, which assumes a position of an anchor, connects to ST 16 through AP 14, while leaving a path, as it is, between AP 13 and ST 15 through AP 12. Then, AP 13 relays the communication between ST 15 connected through AP 12 and ST 16 connected through AP 14.

Subsequently, AP 13, which serves as an anchor, can optimize the communication path between ST 15 and ST 16. The optimization means that the path is changed to directly connect between AP 12 connected to ST 15 and AP 14 connected to ST 16 without intervention of the anchor (AP 13) for exchanging data therebetween.

For the optimization, AP 13 first requests CTRL 11 to determine whether or not the optimization is applicable to the communication path. If applicable, CTRL 11 switches the path between ST 15 and ST 16 to an optimal path which does not run by way of AP 13 which serves as an anchor. As a result, data between ST 15 and ST 16 connected through AP 13 as an anchor is exchanged over a path which directly connects AP 12 with AP 14 without intervention of AP 13. The path optimization can be realized, for example, through IP encapsulation which employs an IP tunnel.

Figure 5:
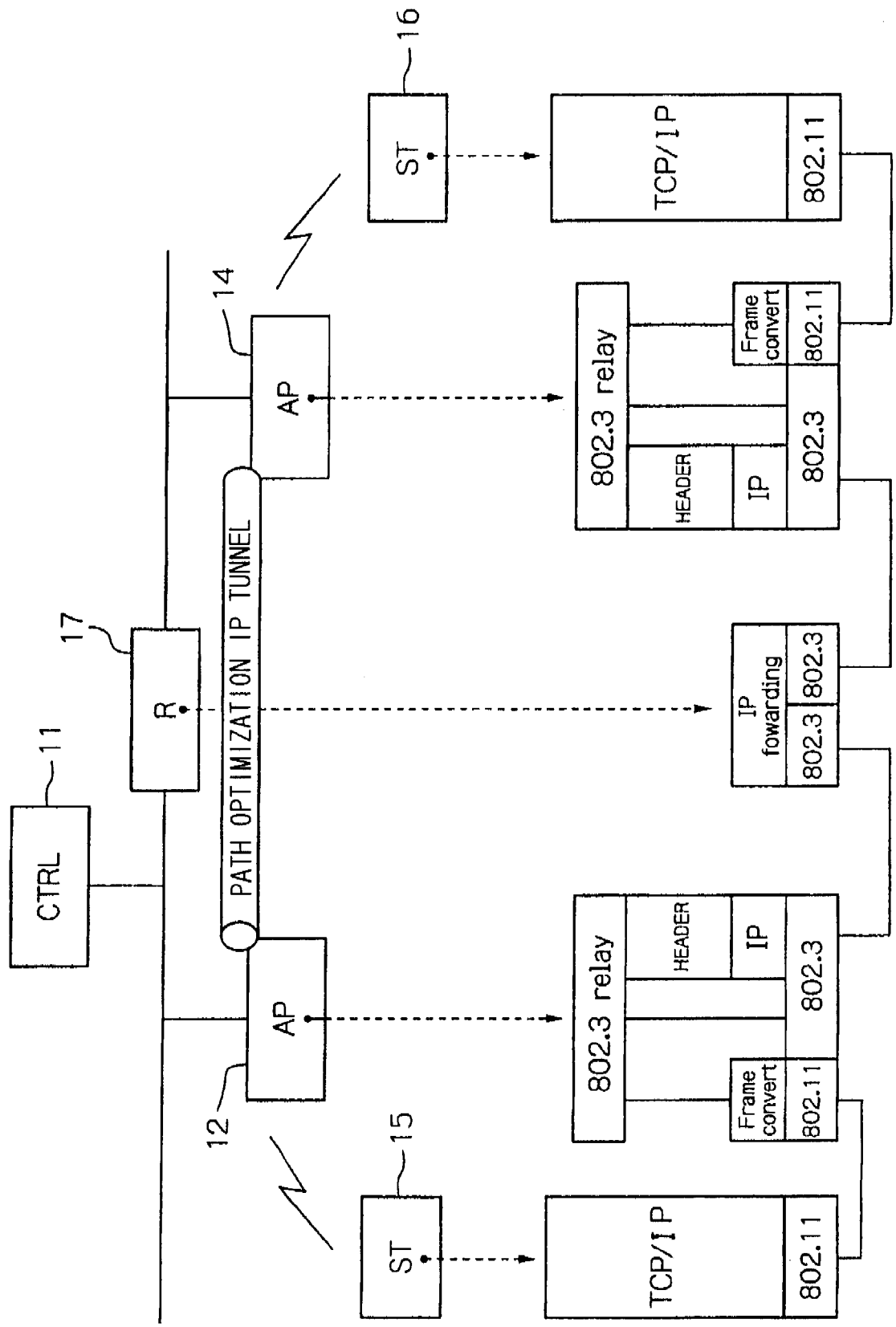
FIG. 5 is a diagram illustrating a protocol stack of each device in a wireless communications system which performs an optimization with an IP tunnel.

FIG. 5 is a diagram illustrating a protocol stack of each device in a wireless communications system which relies on the IP tunnel for the optimization. Referring to FIG. 5, STs 15, 16 transmit/receive data in frames of IEEE802.11(802.11 frames) in accordance with TCP/IP. The IEEE802.11 protocol for wireless LAN is employed between ST 15 and AP 12 and between ST 16 and AP 14. APs 12, 14 convert the protocol, i.e., IEEE802.11 frames between the APs and STs to Ethernet frames according to IEEE802.3 (802.3 frames), convert addresses in accordance with an IP tunnel table which contains destination information for the IP tunnel which has been set for the optimization, and transmit/receive the resulting frames to/from each other. Router (R) 17 is located between AP 12 and AP 14 for IP-based forwarding of IEEE802.3 frames.

CTRL 11 intensively manages APs 12-14 to perform such processing as connections of STs 15, 16 to APs 12-14, movements of STs 15, 16 among APs 12-14, and the like.

Figure 6:
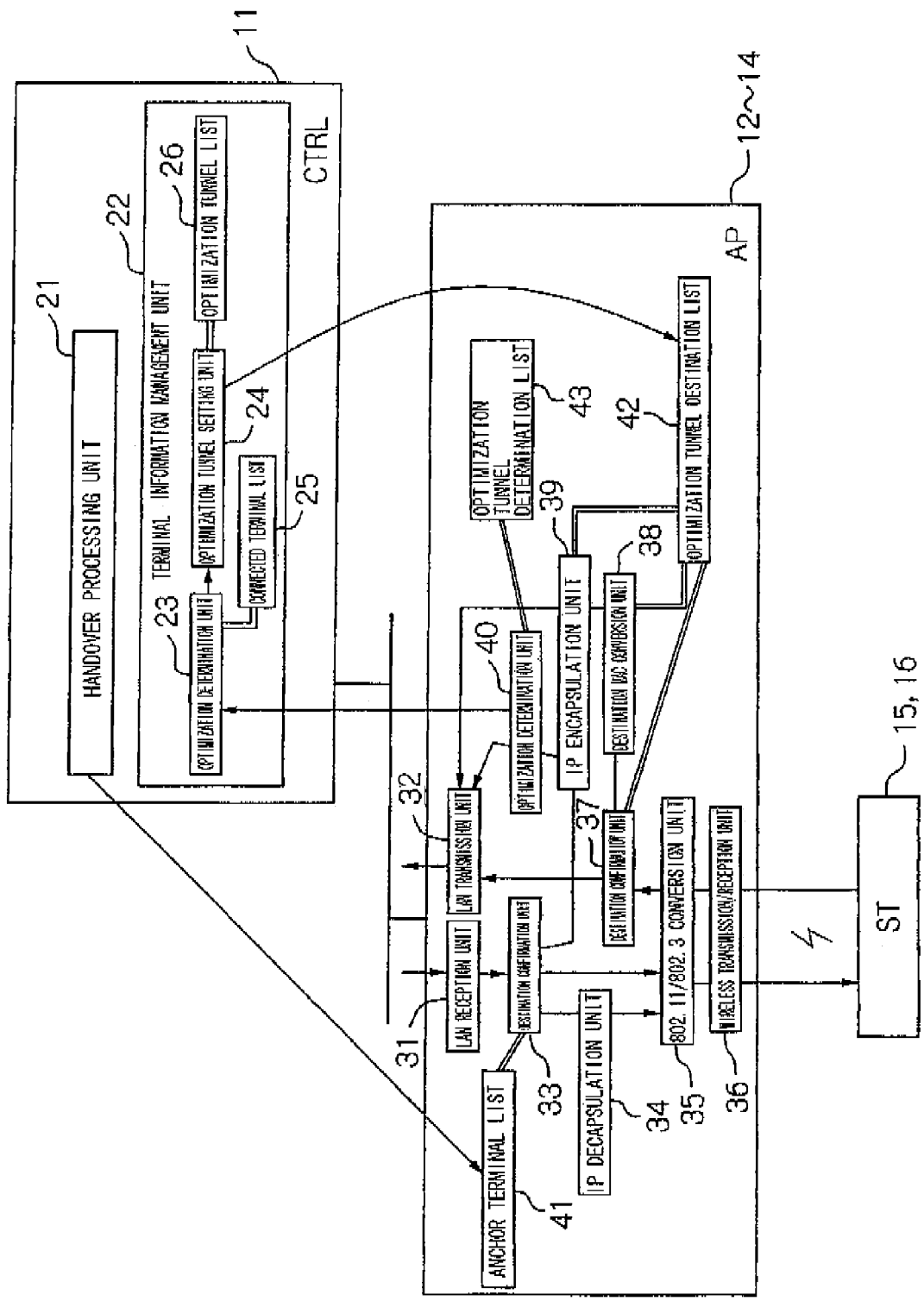
FIG. 6 is a block diagram illustrating the configuration of CTRL and AP in the first embodiment.

FIG. 6 is a block diagram illustrating the configuration of CTRL and AP in the first embodiment.

Referring to FIG. 6, CTRL 11 comprises handover processing unit 21, and terminal information management unit 22. Terminal information management unit 22 comprises optimization determination unit 23 and optimization tunnel setting unit 24.

Each of APs 12-14 in turn comprises LAN reception unit 31, LAN transmission unit 32, destination confirmation unit 33, IP decapsulation unit 34, 802.11/802.3 conversion unit 35, wireless transmission/reception unit 36, destination confirmation unit 37, destination MAC conversion unit 38, IP encapsulation unit 39, and optimization determination unit 40.

In CTRL 11, handover processing unit 21 performs handover processing when ST moves from one AP to another. This handover causes the ST to be connected to another AP through the AP that assumes a position of an anchor, to which the ST has been so far connected (anchor connection), so that CTRL 11 notifies the AP which assumes the position of the anchor for the anchor connected ST. This information is recorded in anchor terminal list 41 in each AP 12-14.

Optimization determination unit 23, when requested by AP, determines whether or not the optimization is applicable to a communication path of an anchor connected ST. In this event, optimization determination unit 23 determines whether or not the optimization is applicable with reference to connected terminal list 25. Connected terminal list 25 is a list of ST belonging information which has been notified from the AP. The ST belonging information includes an MAC address and an IP address of ST connected to AP, and an IP address of AP which serves as an anchor when the ST is anchor connected. The optimization is applicable when an anchor connected path to be determined is a path which interconnects STs, which are connected to respective APs of the wireless communications system.

Optimization tunnel setting unit 24 performs the optimization for a path which can be optimized, as determined by optimization determination unit 23. In this event, optimization tunnel setting unit 24 instructs both APs, to which STs are connected, to set an IP tunnel which directly connects them without intervention of the anchor. Each AP records the destination of the set IP tunnel in optimization tunnel destination list 42. Optimization tunnel destination list 42 is comparable to the aforementioned IP tunnel table. Optimization tunnel setting unit 24 also records therein information on the IP tunnel in optimization tunnel list 26 when it sets the IP tunnel for optimizing the path.

On the other hand, in each of APs 12-14, LAN reception unit 31 is connected to a wired LAN to receive data therefrom. LAN transmission unit 32 is connected to the wired LAN to transmit data thereto.

Destination confirmation unit 33 confirms destinations of packets received by LAN reception unit 31, and distributes the packets in accordance with the destinations. In this event, when a received packet is destined to ST which is connected to the AP itself, destination confirmation unit 33 sends the packet to 802.11/802.3 conversion unit 35. Alternatively, when the packet is destined to ST which is connected to another AP which serves as an anchor, destination confirmation unit 33 sends the packet to LAN transmission unit 32 through IP encapsulation unit 39 and optimization determination unit 40. In this event, destination confirmation unit 33 can confirm an anchor connected ST by referencing anchor terminal list 41. Further alternatively, with an IP tunnel packet for the optimization, destination confirmation unit 33 sends the packet to IP decapsulation unit 34.

IP decapsulation unit 34 decapsulates an IP-encapsulated packet, and sends the decapsulated packet to 802.11/802.3 conversion unit 35.

802.11/802.3 conversion unit 35 converts an 802.3 frame from destination confirmation unit 33 or IP decapsulation unit 34 to an 802.11 frame which is sent to wireless transmission/reception unit 36, and converts an 802.11 frame from wireless transmission/reception unit 36 to an 802.3 frame which is sent to destination confirmation unit 37.

Wireless transmission/reception unit 36 transmits/receives 802.11 frames to/from ST through a wireless channel.

Destination confirmation unit 37 confirms destinations of packets from 802.11/802.3 conversion unit 35, and distributes the packets in accordance with the destinations. In this event, destination confirmation unit 37 determines a packet to be IP-encapsulated, which has an optimized communication path, by referencing optimization tunnel destination list 42. Then, destination confirmation unit 37 sends the packet to be IP-encapsulated to destination MAC conversion unit 38, and sends the remaining packets to LAN transmission unit 32.

Destination MAC conversion unit 38 converts the MAC address of a packet from destination confirmation unit 37 with reference to optimization tunnel destination list 42. Since the packet from destination confirmation unit 37 has an IP address directed to ST which has been set for the IP tunnel, and an MAC address directed to a default gate way, the MAC address is converted to be directed to the same ST as the IP address.

IP encapsulation unit 39 IP-encapsulates a packet, the MAC address of which has been converted by destination MAC conversion unit 38 for an optimized path. Then, IP encapsulation unit 39 sends the IP-encapsulated packet for the optimization to LAN transmission unit 32. This IP encapsulation permits the packet to be directly sent to counterpart AP of the IP tunnel.

For a path which is anchor connected and is not optimized, on the other hand, IP encapsulation unit 39 IP-encapsulates packets which are transferred through an IP tunnel between AP which serves as an anchor and AP which is actually connected to ST. Then, IP encapsulation unit 39 sends the packet, which has been IP-encapsulated for anchor connection, to optimization determination unit 40.

Optimization determination unit 40 queries CTRL 11 whether or not the optimization is applicable to a path of packets from IP encapsulation unit 39, and requests CTRL 11 to perform the optimization if applicable. When determining that the optimization is not applicable, optimization determination unit 23 of CTRL 11 may notify APs 12-14 to that effect, such that APs 12-14 record the notification in optimization tunnel determination list 43. In doing so, optimization determination unit 40 of each AP 12-14 can recognize a path which has been determined in the past that the optimization was not applicable thereto by referencing optimization tunnel determination list 43. In this event, optimization determination unit 40 of each AP 12-14 may not query CTRL 11 in regard to a path which has been determined in the past that the optimization was not applicable thereto, but may query CTRL 11 in regard to only a path which has not been determined in the past that the optimization was not applicable thereto. Optimization determination unit 44 does not again determine for those paths which were determined in the past that the optimization was not applicable thereto, and can determine only those paths which were not determined in the past that the optimization was not applied thereto. In this way, it is possible to omit wasteful query processing.

A description will now be given of an exemplary operation in the wireless communications system of this embodiment.

Figure 7:
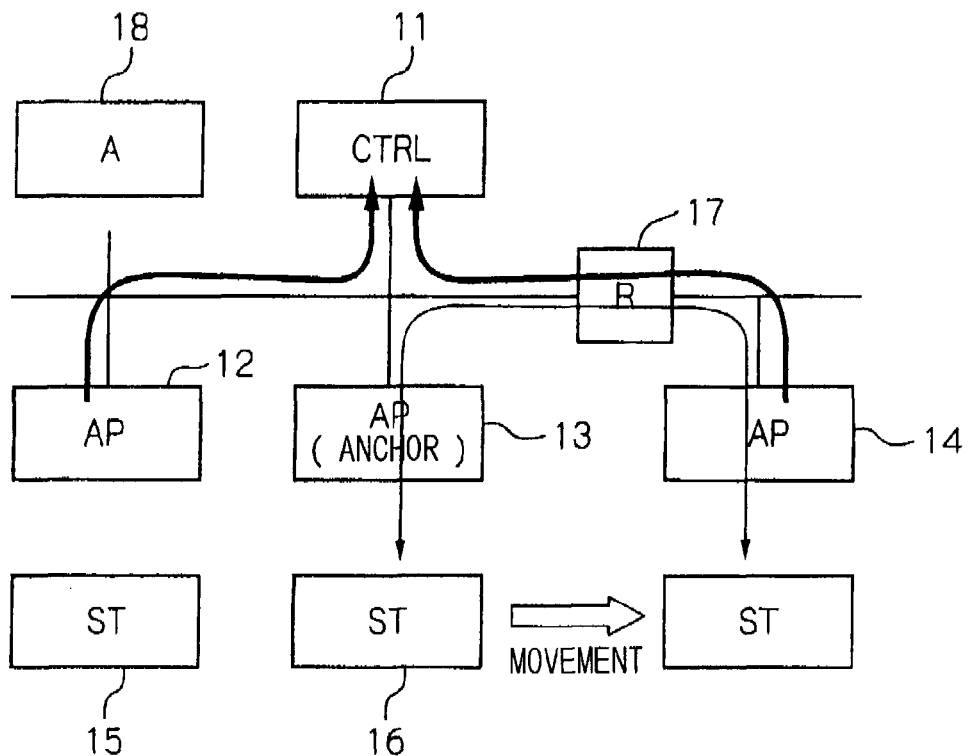
FIG. 7 is a conceptual diagram for describing exemplary operations up to an anchor connection in the first embodiment.

FIG. 7 is a conceptual diagram for describing exemplary operations up to an anchor connection in the first embodiment. Referring to FIG. 7, ST 15 is connected to AP 12, while ST 16 is connected to AP 13. Consider a scenario in which ST 16 moves from AP 13 to AP 14 in this state.

Upon connection with ST, each AP 12-14 notifies CTRL 11 of the MAC address and IP address of this ST as ST belonging information. On the other hand, upon connection with ST through another AP which assumes a position of an anchor, each AP 12-14 notifies CTRL 11 of the IP address of the AP which assumes the position of the anchor, in addition to the MAC address and IP address of the ST, as the ST belonging information.

Referring to FIG. 7, AP 12, to which ST 15 is connected, notifies CTRL 11 of the MAC address and IP address of ST 15. On the other hand, AP 14, to which ST 16 is connected by way of another AP (AP 13) which serves as an anchor, notifies CTRL 11 of the IP address of AP 13 which serves as an anchor, in addition to the MAC address and IP address of ST 16.

Upon receipt of these addresses, CTRL 11 manages the ST MAC address, ST IP address, and anchor IP address in connected terminal list 25 on an AP-by-AP basis.

When ST 16 is connected to AP 14 in another sub-net by way of AP 13 which serves as an anchor, a source MAC address transmits frames of ST 16 to a wired LAN such that AP 13, which serves as an anchor, can receive packets destined to ST 16, which flow over the same wired LAN (sub-net). Here, each AP transfers data.

Then, AP 13 operates as an anchor for ST 16 to relay all communications between ST 16, which has moved, and ST 15, or server (A) 18.

An 802.11 frame from ST 16 to ST 15 is received by AP 14 and converted to an 802.3 frame. Then, AP 14 IP-encapsulates the 802.3 frame, and transfers the IP-encapsulated frame to AP 13 (anchor). AP 13 (anchor) decapsulates the frame transferred from AP 14, and transfers the 802.3 frame to a wired LAN.

On the other hand, AP 12, to which ST 15 is connected, converts an 802.11 frame received from ST 15 and destined to ST 16 to an 802.3 frame which is then transmitted to the wired LAN in accordance with routing information.

From this state, the AP which serves as an anchor optimizes a path which has been temporarily established by an anchor function. Operations for the path optimization will be described below with reference to a more specific exemplary configuration.

Figure 8:
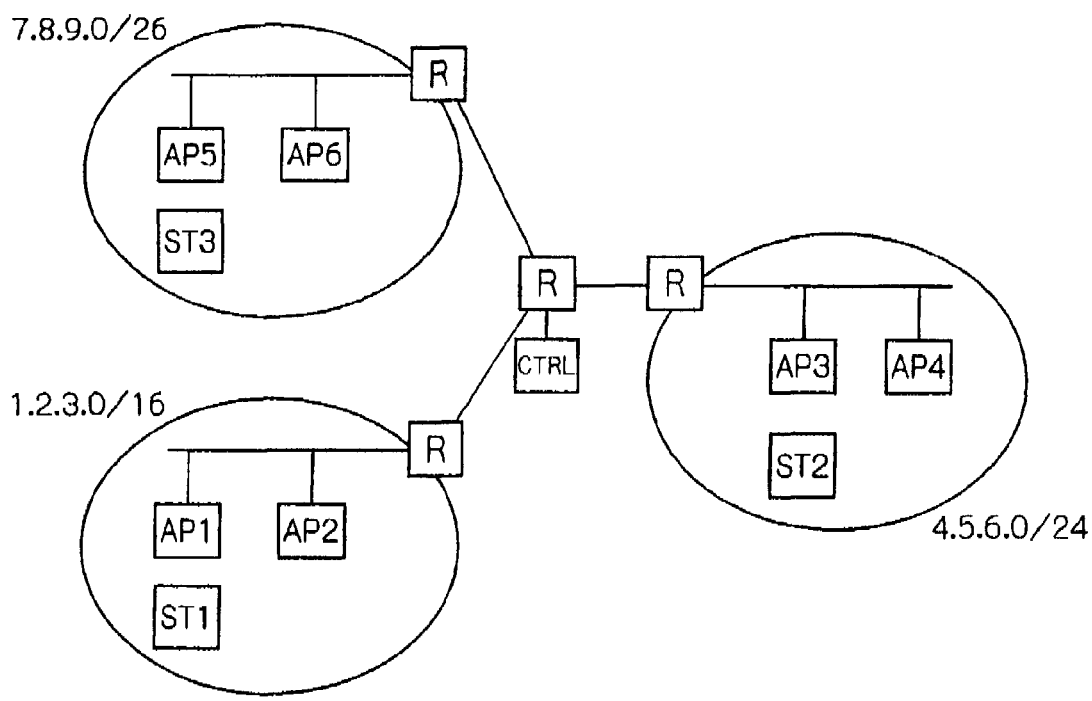
FIG. 8 is a diagram for describing a specific example of a path optimization according to the first embodiment.

FIG. 8 is a diagram for describing a specific example of the path optimization according to the first embodiment. In the example of FIG. 8, three sub-nets are connected by way of a plurality of routers R. Each sub-net is assigned an address.

Wireless base station AP 1 and wireless base station AP 2 are connected to a sub-net, the address of which is 1.2.3.0/16. Wireless base stations AP 3, AP 4 are connected to a sub-net, the address which is 4.5.6.0/24. Wireless base station AP 5 and wireless base station AP 6 are connected to a sub-net, the address of which is 7.8.9.0/26.

A description will be given of the operation of the specific example illustrated in FIG. 8.

Figure 9:
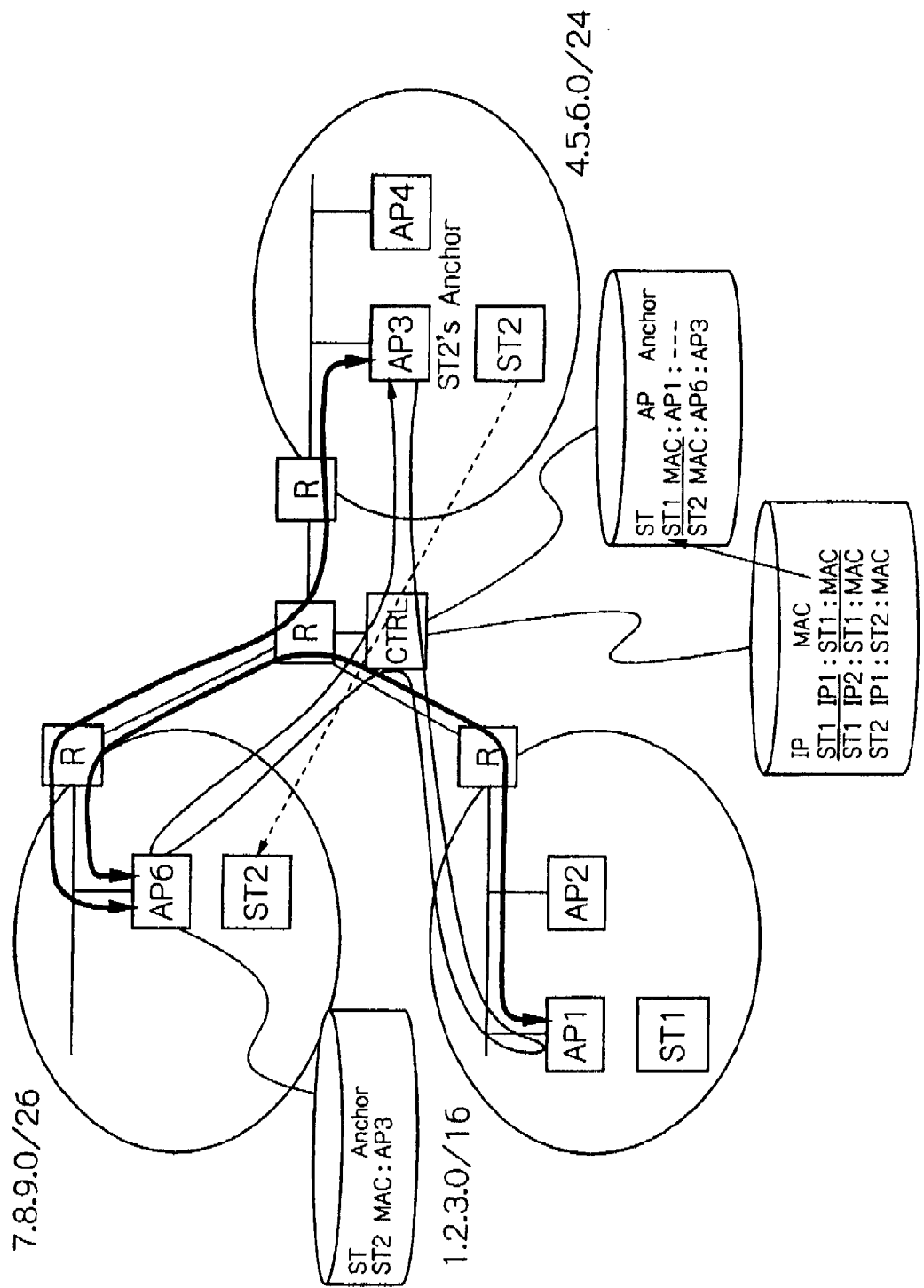
FIG. 9 is a diagram for describing the operation of the specific example illustrated in FIG. 8.

FIG. 9 is a diagram for describing the operation of the specific example illustrated in FIG. 8. As illustrated in FIG. 9, when wireless mobile station ST 2 moves from AP 3 to AP 6, as indicated by a dotted line, in an initial belonging state of FIG. 8, AP 3 operates as an anchor for ST 2. When wireless mobile station ST 1 communicates with ST 2 after ST 2 has moved to AP 6, all communications pass through AP 3 which serves as an anchor.

Then, AP 3 which serves as an anchor starts an optimization process from this state.

AP 3 requests CTRL to determine whether or not packets transferred to AP 6 by AP 3 as an anchor and destined to ST 2 need not pass through AP 3 itself, so that the path optimization is applicable.

If ST 1 which is transmitting data to ST 2 is connected to any AP subordinate to CTRL, the path optimization is applicable. Thus, AP 3 queries CTRL whether or not ST 1 is connected to any AP subordinate to CTRL. Since CTRL contains the ST belonging information in connected terminal list 25, CTRL searches connected terminal list 25 for the MAC address of ST 1 from the IP address of ST 1.

When the IP address and MAC address of ST 1 are managed by CTRL, it can be determined that ST 1 is connected to AP subordinate to CTRL. On the other hand, when the IP address and MAC address of ST 1 are not managed by CTRL, ST 1 is not connected to AP subordinate to CTRL, so that the path cannot be optimized.

When the path can be optimized, CTRL instructs AP 1 and AP 6 to set an IP tunnel therebetween for communications of ST 1 with ST 2. As AP 1 and AP 6 have completed the setting of the IP tunnel for communications of ST 1 with ST 2, communications between ST 1 and ST 2 are directly made between AP 1 and AP6.

Figure 10:
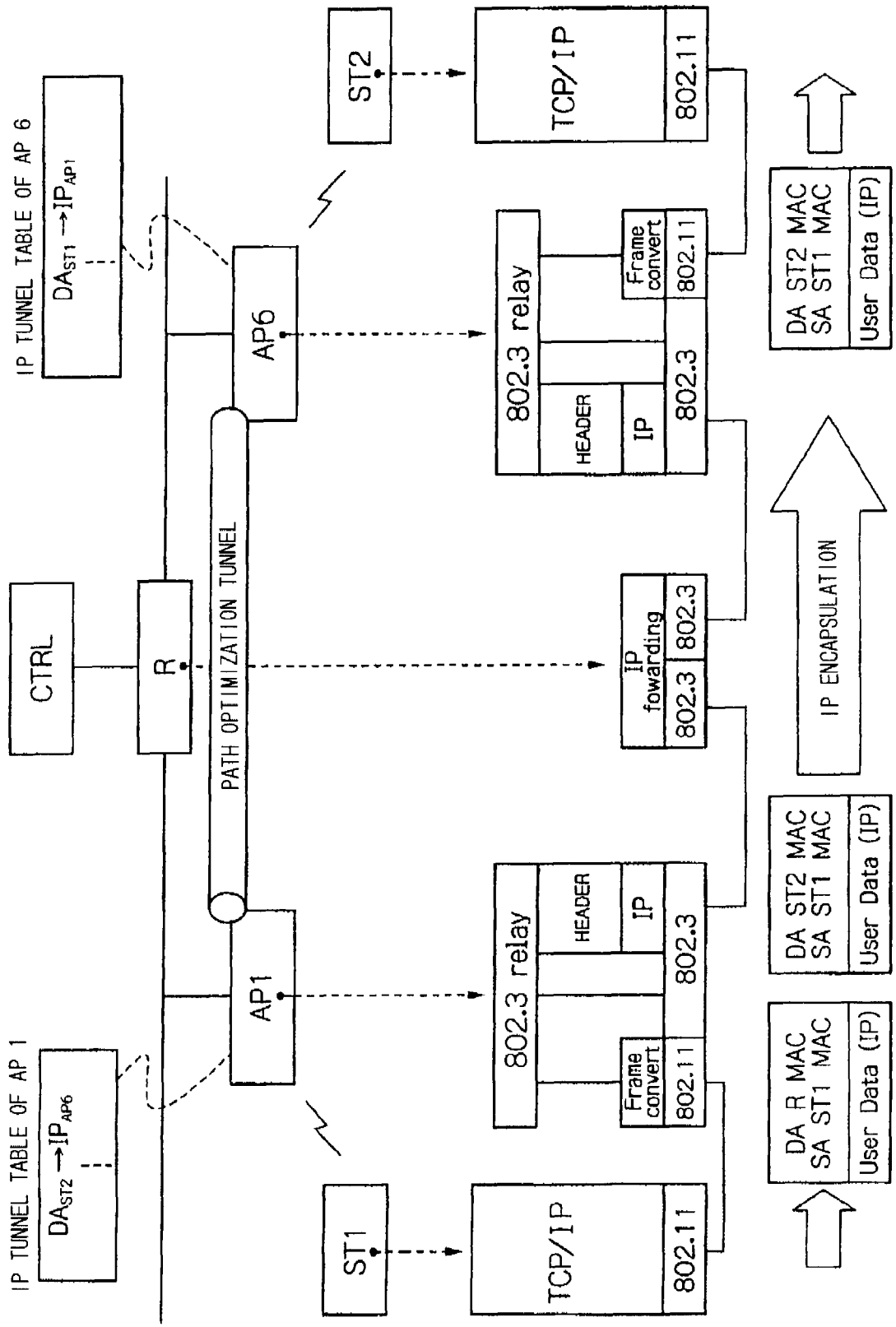
FIG. 10 is a diagram illustrating a protocol stack of each device in the specific example illustrated in FIG. 8, and how the address of a packet is converted when it is transferred between devices in IP tunnel processing.

FIG. 10 is a diagram illustrating a protocol stack of each device in the specific example illustrated in FIG. 8, and how the address of packet is converted when it is transferred between devices in the IP tunnel processing The address conversion is shown for a packet which travels from ST 1 to ST 2. A packet traveling from ST 2 to ST 1 is processed in a manner similar to the frame which travels from ST 1 to ST 2.

In the IP tunnel processing, AP 1 converts an 802.11 frame received from ST 1 to an 802.3 frame. In AP 1, the destination MAC address of a packet from ST 1 to ST 2 is set to a MAC address of default gateway R. This is because ST 1 and ST 2 belong to different sub-nets.

When the destination IP address of the packet is ST 2, AP 1 changes the destination MAC address to the MAC address of ST 2.

AP 1 also has an IP tunnel table for transferring a packet of ST 2, the destination MAC address of which is ST 2, to the IP address of AP 6 through the IP tunnel processing. Thus, when the destination MAC address of a packet is ST 2, AP 1 IP-encapsulates the packet and transfers the encapsulated packet to AP 6.

Upon receipt of the packet, AP 6 decapsulates the packet, and converts the decapsulated packet to an 802.11 frame which is transferred to ST 2.

Figure 11:
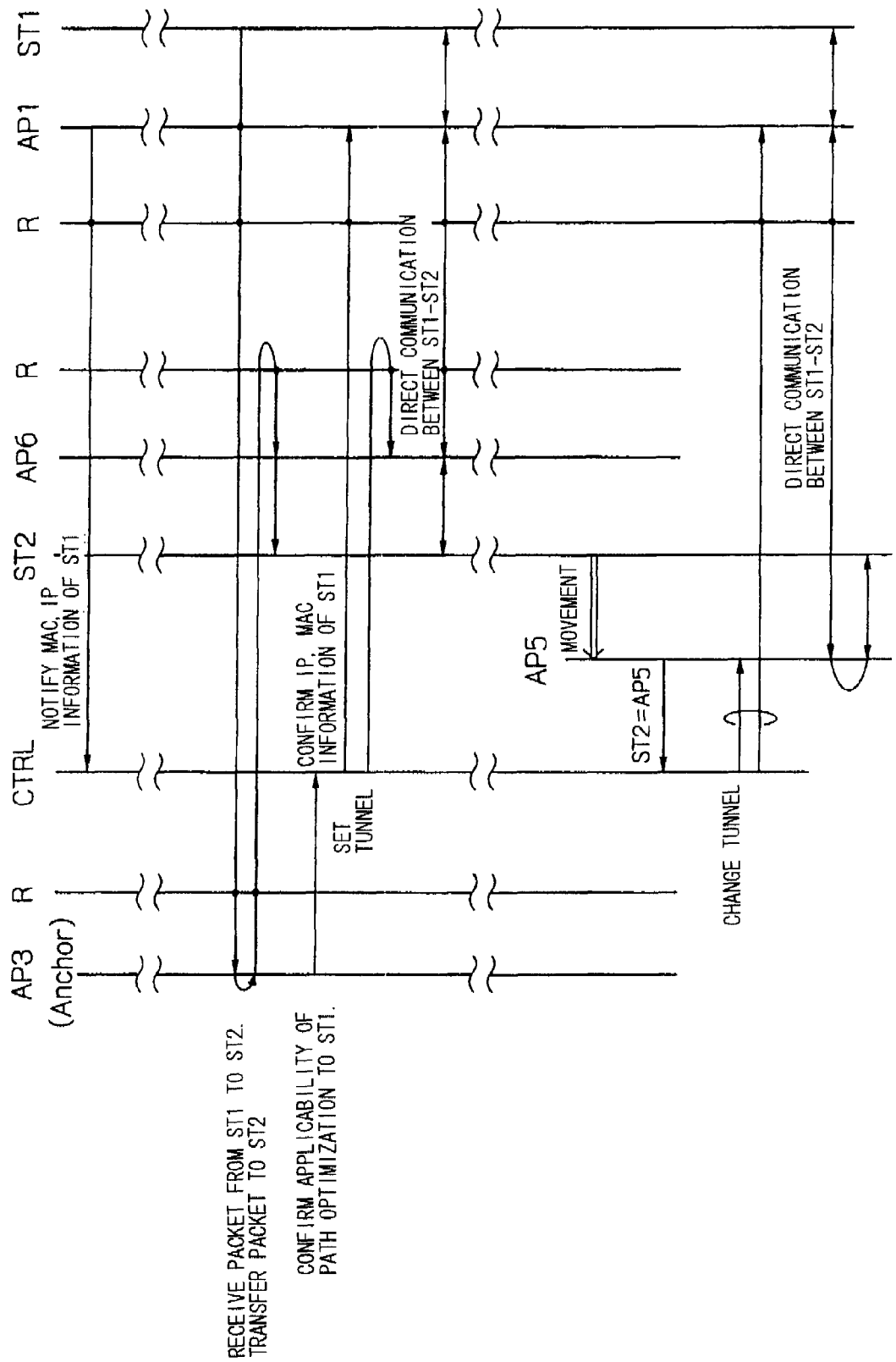
FIG. 11 is a sequence diagram illustrating operations for the path optimization in the specific example illustrated in FIG. 8.

FIG. 11 is a sequence diagram illustrating operations for the path optimization in the specific example illustrated in FIG. 8. In FIG. 11, assume that ST 1 is connected to AP 1, while ST 2 is connected to AP 6 by way of AP 3 which serves as an anchor.

As illustrated, AP 1 notifies CTRL of ST belonging information (MAC, IP information) of ST 1. Also, a packet from ST 1 to ST 2 is sent from AP 1 to AP 6 to which ST 2 is connected, by way of AP 3 which serves as an anchor. Then, the packet from ST 1 is sent from AP 6 to ST 2.

From this state, AP 3 which serves as an anchor requests CTRL to determine whether or not the path optimization is applicable.

CTRL confirms the ST belonging information (MAC, IP information) of ST 1 to determine whether or not the path optimization is applicable. Here, the optimization is applicable. Accordingly, CTRL instructs AP 1 and AP 6 to set an IP tunnel. In this connection, CTRL instructs AP 1 and AP 6 to set an IP tunnel after it has determined that the path optimization is applicable in the example shown herein, but the present invention is not limited to such an example. Alternatively, CTRL may notify AP 3, which serves as an anchor, that the path optimization is applicable, so that AP 3 instructs AP 1 and AP 6 to set an IP tunnel. CTRL may or may not store information on the IP tunnel set by AP 3.

After AP 1 and AP 6 have set the IP tunnel, ST 1 connected to AP 1 directly communicates with ST 2 connected to AP 6 without intervention of AP 3 which serves as an anchor. In the foregoing manner, the path optimization is performed.

FIG. 11 further illustrates an exemplary operation of the wireless communications system when ST 2 moves to another wireless communication controller AP 5. As described above, in this specific example, CTRL instructs AP 1 and AP 6 to set an IP tunnel to optimize the path, so that CTRL can store information on the set IP tunnel. By holding this information, CTRL can further modify the optimized path. According to this example, when ST 2 moves from AP 6 to AP 5, AP 5 notifies CTRL that ST 2 is connected to AP 5. Upon receipt of the notification, CTRL instructs AP 1 and AP 5 to set a new modified IP channel. In response to this instruction, AP 1 and AP 6 set an IP tunnel, with the result that ST 1 connected to AP 1 directly communicates with ST 2 which has been recently connected to AP 5.

As described above, according to this embodiment, when STs are connected to APs on both sides of a communication path which is temporarily established by an anchor function when one ST moves, the path is optimized such that the APs directly transmit/receive data without intervention of an anchor, thus making it possible to permit the STs to continue to communicate even if the ST moves, restrain a concentrated traffic load and an increased load on AP which serves as an anchor, and prevent a longer delay time due to an extended path.

Also, according to this embodiment, in the path optimization process, AP which serves as an anchor reads the address of a packet of ST which passes over a communication path temporarily established by the anchor function when the ST moves, and queries CTRL such that CTRL determines from the location of destination ST whether or not the optimization is applicable, and optimizes the path if applicable, thus making it possible to continue the communication even if the ST moves, and to prevent a concentrated traffic load and an increased delay time.

While this embodiment has shown an example in which the IP tunnel is relied on for the IP encapsulation, the present invention is not limited to this example, but can be widely applied to path optimizations based on encapsulation. As another example, the present invention can also be applied to encapsulation in UDP and the like.

(Second Embodiment)

In the first embodiment, CTRL intensively manages the ST belonging information for the path optimization, but the present invention is not so limited. As another example, in a second embodiment, the ST belonging information is managed by each AP. Therefore, in this embodiment, AP need not query CTRL whether or not ST is connected to AP subordinate to CTRL for the path optimization.

The basic configuration of a wireless communications system according to the second embodiment is similar to the first embodiment illustrated in FIG. 4.

Figure 12:
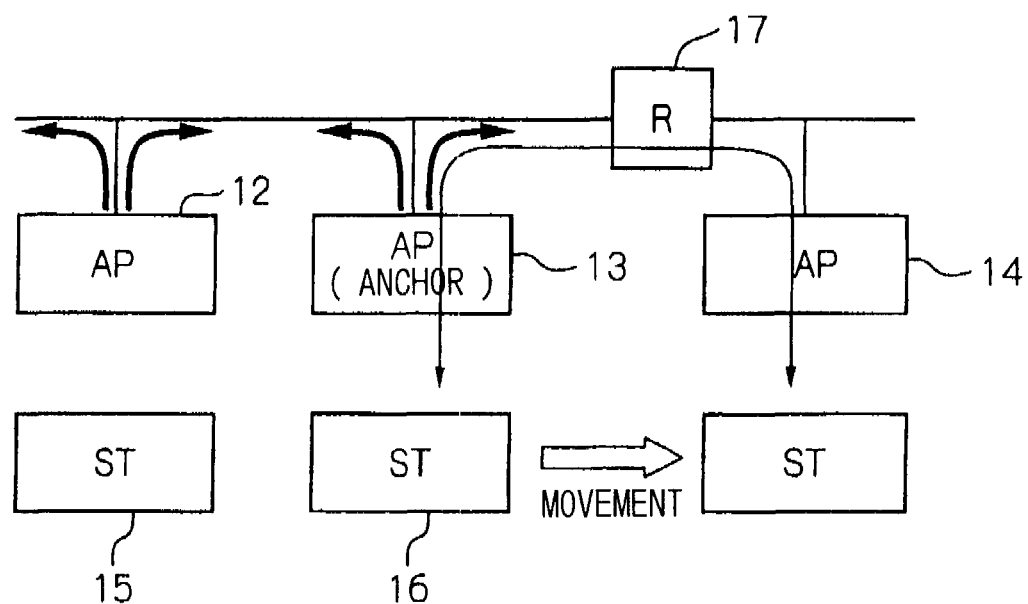
FIG. 12 is a diagram for describing operations for the path optimization in a second embodiment.

FIG. 12 is a diagram for describing operations for the path optimization in the second embodiment. FIG. 12 shows a change in a state in which a path is temporarily established by the anchor function.

Referring to FIG. 12, ST 15 is connected to AP 12. ST 16 is connected to AP 13 in an initial state, and subsequently moves to AP 14.

In this embodiment, AP to which ST is connected broadcasts ST belonging information over a wired LAN for notification to other APs. Also, upon receipt of ST belonging information from another AP, each AP holds the ST belonging information. In this embodiment, the ST belonging information includes a MAC address of ST and an IP address of AP. Also, AP which functions as an anchor in response to a movement of ST broadcasts the ST belonging information which includes the MAC address of the ST, the IP address of AP to which the ST is connected, and the IP address of the AP itself which serves as an anchor.

In the example of FIG. 12, since ST 15 is connected to AP 12, AP 12 broadcasts the ST belonging information which includes the MAC address of ST 15, and the IP address of AP 12. Also, after ST 16 has moved from AP 13 to AP 14, AP 13, which serves as an anchor for ST 16, broadcasts the ST belonging information which includes the MAC address of ST 16, the IP address of AP 14, and the IP address of AP 13 itself.

Also, each AP recognizes an IP address of at least one AP (representative AP) in each of other sub-nets, and can query a representative AP in another sub-net if necessary. Upon receipt of a query from AP in another sub-net, the representative AP can respond to the query.

From this state, AP which serves as an anchor optimizes a path which has been temporarily established by the anchor function. The AP which serves as an anchor examines the source address of a frame which is being transferred thereby as an anchor, and queries representative AP of another sub-net to which AP is connected the ST that has the source address. In the example of FIG. 12, AP 13 which serves as an anchor queries AP 14 which belongs to another sub-net. AP 14 responds to the query that ST 16 is connected to AP 14 itself.

This query permits the AP to know the other AP to which the ST indicated by the source address is connected. The other AP is connected to another sub-net.

The AP, which can know the AP of the other sub-net to which the ST is connected, instructs AP which is designated to be the destination of the transferred frame to set an IP tunnel between the AP itself and the AP to which the ST having the source address is connected. In the example of FIG. 12, AP 13 instructs AP 12 to set an IP tunnel between AP 12 and AP 14.

Upon completion of the setting of the IP tunnel, frames which have been transferred through the anchor over the temporarily set path are directly exchanged between the APs to which the respective STs are connected.

Figure 13:
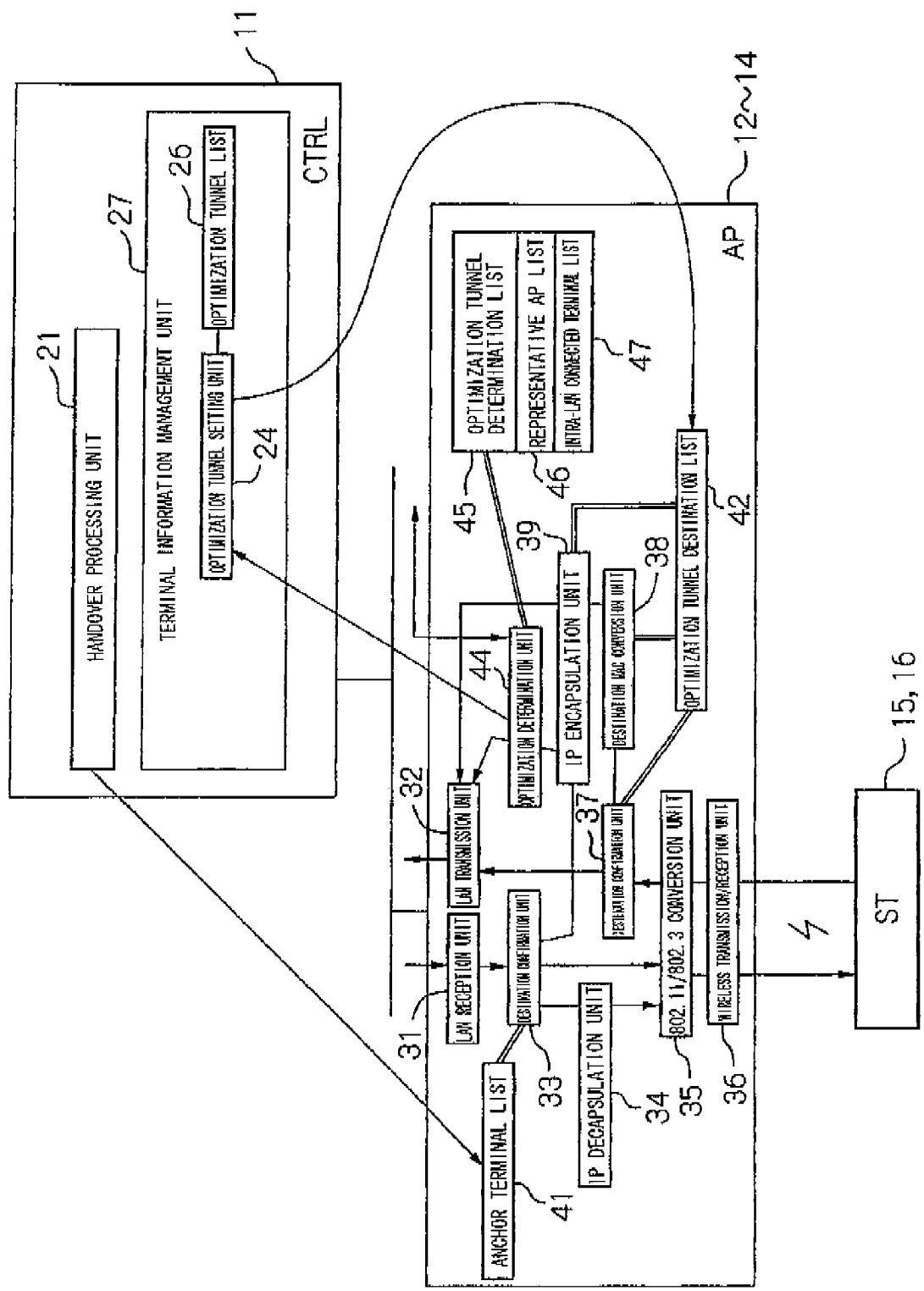
FIG. 13 is a block diagram illustrating the configuration of CTRL and AP in the second embodiment.

FIG. 13 is a block diagram illustrating the configuration of CTRL and AP in the second embodiment.

Referring to FIG. 13, CTRL 11 comprises handover processing unit 21 and terminal information management unit 27. Terminal information management unit 27 has optimization tunnel setting unit 24.

Each of APs 12-14 in turn comprises LAN reception unit 31, LAN transmission unit 32, destination confirmation unit 33, IP decapsulation unit 34, 802.11/802.3 conversion unit 35, wireless transmission/reception unit 36, destination confirmation unit 37, destination MAC conversion unit 38, IP encapsulation unit 39, and optimization determination unit 44.

In CTRL 11, handover processing unit 21 performs handover processing when ST moves from one AP to another. This handover causes the ST to be connected to another AP through the AP that assumes a position of an anchor, to which the ST has been so far connected (anchor connection), so that CTRL 11 notifies the AP which assumes the position of the anchor for the anchor connected ST. This information is recorded in APs 12-14 in anchor terminal list 41.

Optimization tunnel setting unit 24 optimizes a path to which the optimization is applicable, as determined by optimization determination unit 44 of each AP 12-14. Upon receipt of an instruction from AP 12-14 to optimize the path, optimization tunnel setting unit 24 sets an IP tunnel through which both APs, to which STs are connected, are directly connected without intervention of the anchor. Each AP 12-14 records the destination of the set IP tunnel in optimization tunnel destination list 42. Optimization tunnel destination list 42 is equivalent to the aforementioned IP tunnel table. Also, optimization tunnel setting unit 24 itself records information on the IP tunnel in optimization tunnel list 26 after it has set the IP tunnel for optimizing the path.

On the other hand, in each AP 12-14, LAN reception unit 31 is connected to a wired LAN to receive data therefrom. LAN transmission unit 32 is connected to the wired LAN to transmit data thereto.

Destination confirmation unit 33 confirms destinations of packets received by LAN reception unit 31 and distributes the packets in accordance with the destinations. In this event, when a received packet is destined to ST which is connected to the AP itself, destination confirmation unit 33 sends the packet to 802.11/802.3 conversion unit 35. On the other hand, when a packet is destined to ST connected to another AP by way of the AP itself which serves as an anchor, destination confirmation unit 33 sends the packet to LAN transmission unit 32 through IP encapsulation unit 39 and optimization determination unit 44. In this event, destination confirmation unit 33 can confirm the anchor connected ST by referencing anchor terminal list 41. Further, when a packet is associated with an IP tunnel for the optimization, destination confirmation unit 33 sends the packet to IP decapsulation unit 34.

IP decapsulation unit 34 decapsulates an IP-encapsulated packet and sends the decapsulated packet to 802.11/802.3 conversion unit 35.

802.11/802.3 conversion unit 35 converts an 802.3 frame from destination confirmation unit 33 or IP decapsulation unit 34 to an 802.11 frame which is sent to wireless transmission/reception unit 36, and converts an 802.11 frame from wireless transmission/reception unit 36 to an 802.3 frame which is sent to destination confirmation unit 37.

Wireless transmission/reception unit 36 transmits/receives 802.11 frames to/from ST through a wireless channel.

Destination confirmation unit 37 confirms destinations of packets from 802.11/802.3 conversion unit 35, and distributes the packets in accordance with the destinations. In this event, destination confirmation unit 37 determines packets to be IP-encapsulated, for which a communication path has been optimized, by referencing optimization tunnel destination list 42. Then, destination confirmation unit 37 sends the packets to be IP-encapsulated to destination MAC conversion unit 38, and sends the remaining packets to LAN transmission unit 32.

Destination MAC conversion unit 38 converts the MAC address of a packet from destination confirmation unit 37 with reference to optimization tunnel destination list 42. Since the packet from destination confirmation unit 37 has an IP address destined to ST for which an IP tunnel is set, and a MAC address set to a default gateway, destination MAC conversion unit 38 converts the MAC address to be destined to the same ST as the IP address.

IP encapsulation unit 39 IP-encapsulates a packet, the MAC address of which has been converted by destination MAC conversion unit 38, for an optimized path. Then, IP encapsulation unit 39 sends the packet which has been IP-encapsulated for the optimization to LAN transmission unit 32. This IP encapsulation permits the packet to be directly sent to the counterpart AP of the IP tunnel.

Also, for a path which is connected by way of the anchor and is not optimized, IP encapsulation unit 39 IP-encapsulates a packet which is transferred through an IP tunnel between AP which serves as an anchor and AP to which ST is actually connected. Then, IP encapsulation unit 39 sends the packet which has been IP-encapsulated for an anchor connection to optimization determination unit 44.

Optimization determination unit 44 determines whether or not the optimization is applicable to a path of packets from IP encapsulation unit 39. In this event, optimization determination unit 44 references intra-LAN connection terminal list 47 to determine whether or not the optimization is applicable. Intra-LAN connection terminal list 47 is a list of ST belonging information which has been mutually notified by APs within LAN. The optimization is applicable to any path under determination which is connected by way of an anchor as long as the path interconnects STs which are connected to APs within the wireless communications system.

Upon determining that the optimization is applicable, optimization determination unit 44 request CTRL 11 to perform the optimization. On the other hand, upon determining that the optimization is not applicable, optimization determination unit 44 may record the determination result in optimization tunnel determination list 45. In doing so, optimization determination unit 44 can recognize a path which was determined in the past that the optimization was not applicable thereto by referencing optimization tunnel determination list 45. In this way, it is possible to omit wasteful query processing.

A description will be given of a specific example of the path optimization according to the wireless communications system of this embodiment. The operation of the path optimization will be described below in connection with a more specific exemplary configuration.

Figure 14:
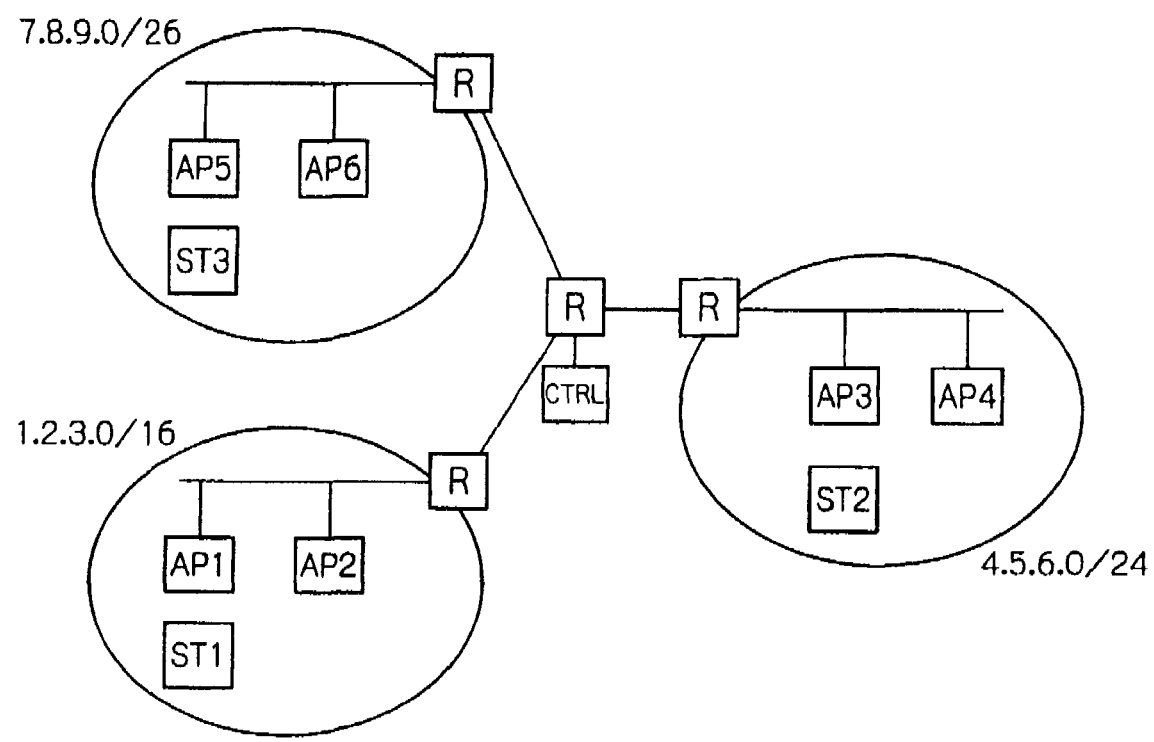
FIG. 14 is a diagram for describing a specific example of the path optimization according to the second embodiment.

FIG. 14 is a diagram for describing a specific example of the path optimization according to the second embodiment. In the example of FIG. 14, three sub-nets are connected by way of a plurality of routers R. Each sub-net is assigned an address.

Wireless base station AP 1 and wireless base station AP 2 are connected to a sub-net which has address 1.2.3.0/16. Wireless base stations AP 3, AP 4 are connected to a sub-net, the address of which is 4.5.6.0/24. Wireless base station AP 5 and wireless base station AP 6 are connected to a sub-net, the address of which is 7.8.9.0/26.

A description will be given of the operation of the specific example illustrated in FIG. 14.

Figure 15:
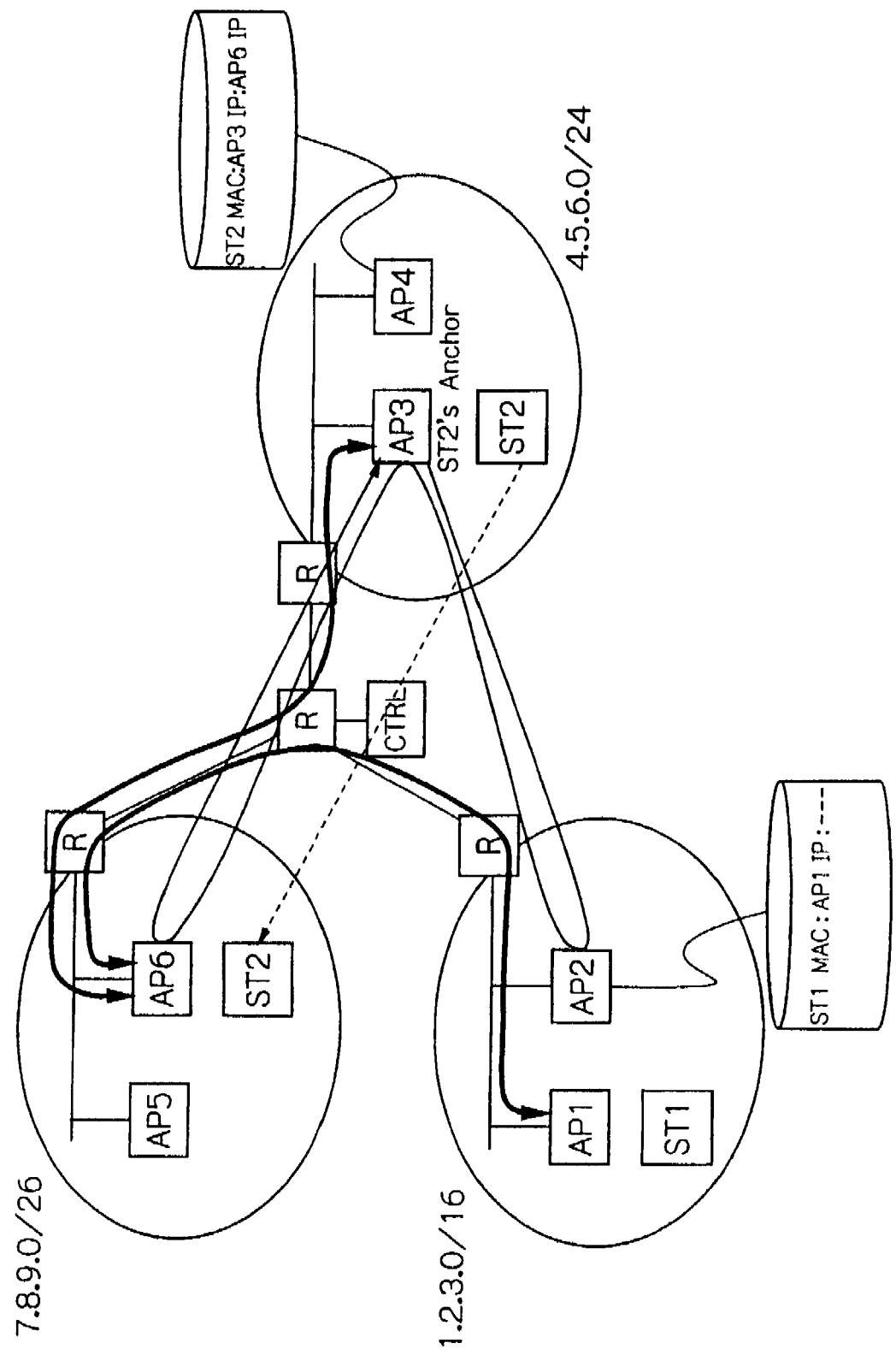
FIG. 15 is a diagram for describing the operation of the specific example illustrated in FIG. 14.

FIG. 15 is a diagram for describing the operation of the specific example illustrated in FIG. 14. As illustrated in FIG. 15, when ST 2 moves from AP 3 to AP 6, as indicated by a dotted line, in an initial belonging state of FIG. 14, AP 3 temporarily operates as an anchor for ST 2. When ST 1 communicates with ST 2 after ST 2 has moved to AP 6, all communications pass through AP 3 which serves as an anchor.

Then, AP 3 which serves as an anchor starts the optimization process from this state.

AP 3 monitors a transferred frame for the source address to determine whether or not the path optimization is applicable. The source address is within 1.2.3.0/16. Assume herein that AP 3 is previously aware from representative AP list 46 that AP 2 belongs to the sub-net of 1.2.3.0/16. In other words, AP 2 is a representative AP.

Accordingly, AP 3 queries AP 2 belonging to the sub-net of 1.2.3.0/16 for AP to which the ST having the source address is connected. AP 2 finds the MAC address from the IP address of the ST through Address Resolution Protocol (ARP), recognizes that the ST is ST 1 which belongs to AP 1, and responds to AP 3 to that effect.

AP 3 perceives the location of the source ST, and determines that an IP tunnel can be set between AP 1 and AP 6. Then, AP 3 instructs AP 6 and AP 1 to set an IP tunnel therebetween. When the IP tunnel has been set, communications between ST 1 and ST 2 are directly made through the IP tunnel between AP 1 and AP 6.

Figure 16:
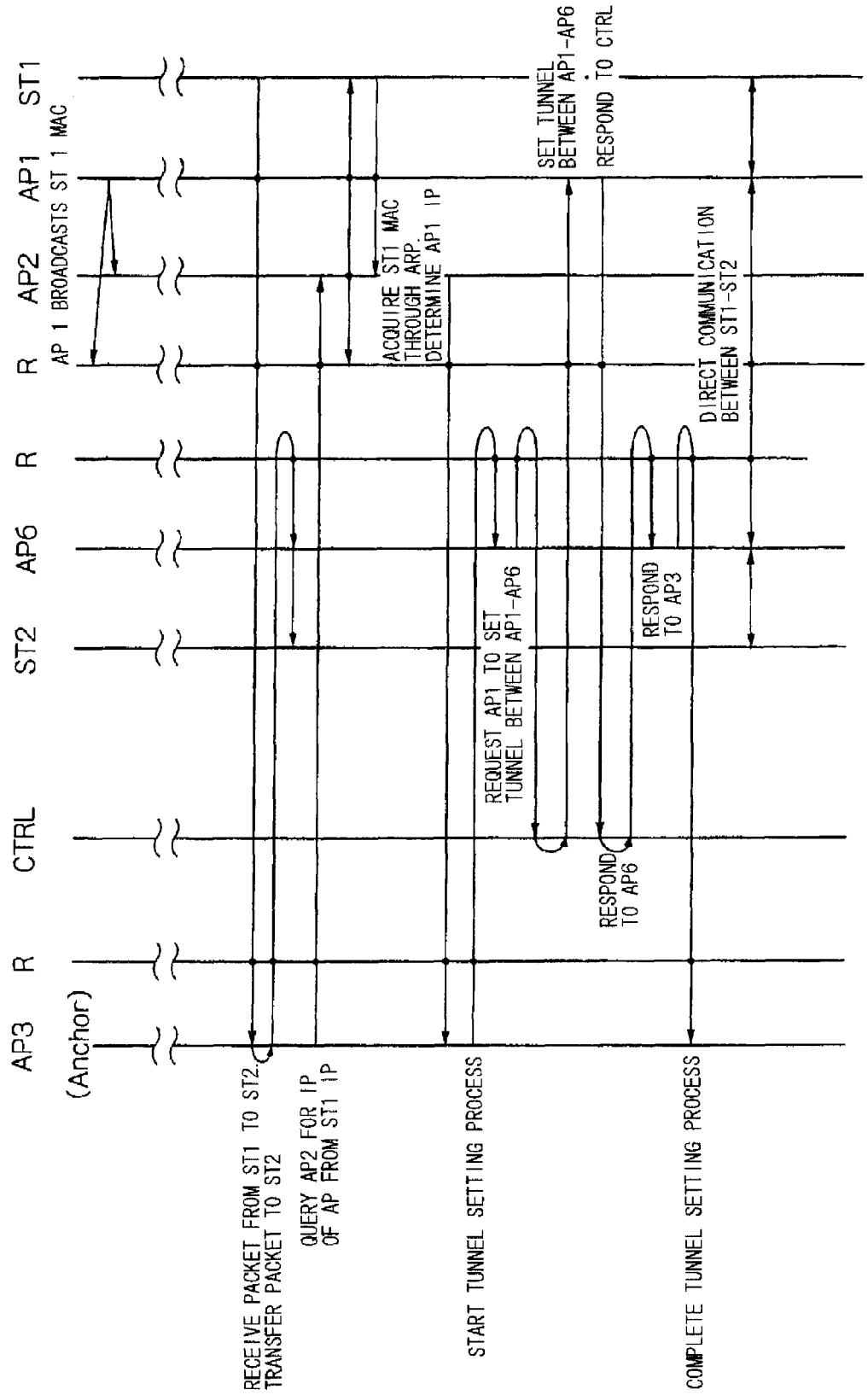
FIG. 16 is a sequence diagram illustrating operations for the path optimization in the specific example illustrated in FIG. 15.

FIG. 16 is a sequence diagram illustrating operations for the path optimization in the specific example illustrated in FIG. 15. Assume in FIG. 16 that ST 1 is connected to AP 1, while ST 2 is connected to AP 6 by way of AP 3 which serves as an anchor.

As illustrated, AP 1 broadcasts ST belonging information of ST 1 over the same LAN. In this way, APs in the same LAN mutually share the ST belonging information in this embodiment. A packet from ST 1 to ST 2 is sent from AP 1 to AP 6 to which ST 2 is connected, by way of AP 3 which serves as an anchor. Then, the packet from ST 1 is sent to ST 2 from AP 6.

From this state, AP 3 which serves as an anchor determines whether or not the path optimization is applicable.

In this event, AP 3 first recognizes, from the IP address of ST 1, the representative AP (AP 2) of the LAN which contains the AP to which ST 1 is connected, and queries AP 2 for the IP address of the AP to which ST 1 is connected. AP 2 acquires the MAC address of ST 1 through ARP. Then, AP 2 recognizes from the ST belonging information previously acquired through the broadcasting from AP 1 that ST 1 is connected to AP 1, and notifies AP 3 of this fact.

AP 3 confirms that ST 1 is connected to AP within the wireless communications system, and determines that the path optimization is applicable.

Accordingly, AP 3 starts a tunnel setting process for the path optimization. In this event, as AP 3 instructs CTRL to optimize the path, CTRL may perform the path optimization process in a manner similar to the first embodiment. Alternatively, in FIG. 16, AP 3 instructs AP 6 to set an IP tunnel between AP 1 and AP 6. AP 6 per se sets an IP tunnel, and requests CTRL to set an IP tunnel. CTRL sends the IP tunnel setting request to AP 1.

After setting the IP tunnel in response to the request, AP 1 responds to CTRL that the setting has been completed. CTRL sends the response to AP 6.

AP 6 confirms that the bidirectional IP tunnel has been set, and responds to AP 3 that the IP tunnel has been set. In the foregoing way, the tunnel has been set for the path optimization, thus enabling ST 1 and ST 2 to communicate without intervention of AP 3 which serves as an anchor.

While this embodiment has shown an example, in which APs within the same LAN previously share the ST belonging information, the present invention is not limited to this example. As another example, all APs belonging to the same wireless communications system, not limited to the same LAN, may share the ST belonging information. This can be implemented, for example, by using unicast or IP multicast. In this event, AP which serves an anchor can determine whether or not the optimization is applicable without putting a query to a representative AP in another LAN.

Figure 17:
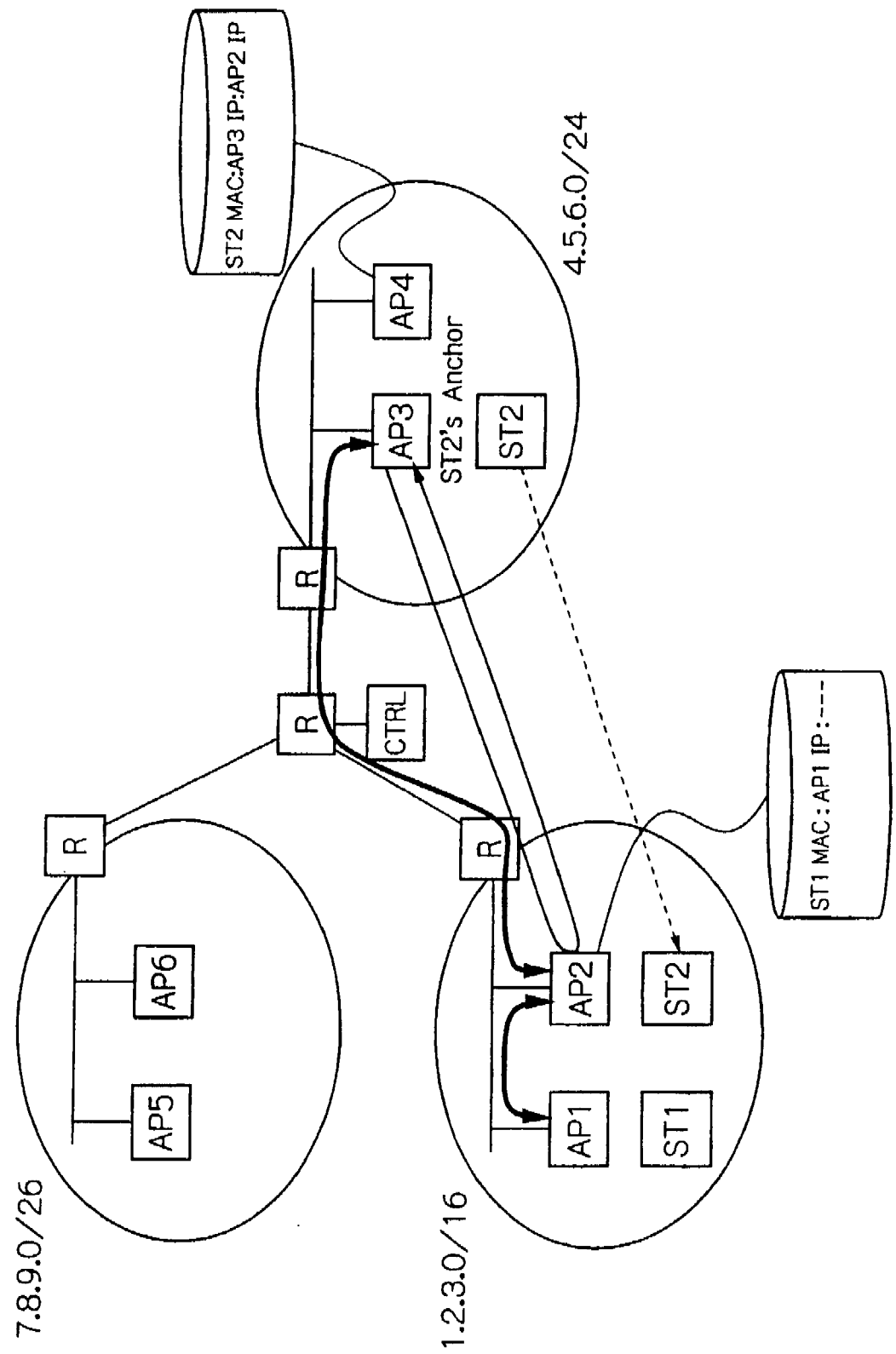
FIG. 17 is a diagram for describing another operation of the specific example illustrated in FIG. 14.

FIG. 17 is a diagram for describing another operation of the specific example illustrated in FIG. 14. As illustrated in FIG. 17, when ST 2 moves from AP 3 to AP 2, as indicated by a dotted line, from the initial belonging state of FIG. 14, AP 3 temporarily operates as an anchor for ST 2. When ST 1 and ST 2 communicate after ST 2 has moved to AP 2, all communications path through AP 3 which serves as an anchor.

Then, AP 3 which serves as an anchor starts the optimization process from this state.

AP 3 monitors a transferred frame for the source address to determine whether or not the path optimization is applicable. The source address is within 1.2.3.0/16. Assume herein that AP 3 is previously aware that AP 2 belongs to the sub-net of 1.2.3.0/16 from representative AP list 46. In other words, AP 2 is a representative AP.

Accordingly, AP 3 queries AP 2 belonging to the sub-net of 1.2.3.0/16 for AP to which the ST having the source address is connected. AP 2 finds the MAC address from the IP address of the ST through ARP, recognizes that the ST is ST 1 which belongs to AP 1, and responds to AP 3 to that effect.

AP 3 perceives the location of the source ST, and determines that an IP tunnel can be set between AP 1 and AP 2. Then, AP 3 instructs AP 2 and AP 1 to set an IP tunnel therebetween. When the IP tunnel has been set, communications between ST 1 and ST 2 are directly made through the IP tunnel between AP 1 and AP 2.

Since AP 2 which belongs to the sub-net of 1.2.3.0/16 and AP 1 which is the destination of transfer are located in the same sub-net, AP 3 may request AP 2 to set an IP tunnel simultaneously with a query put to AP 2 for AP to which the ST having the source address is connected. In this event, AP 2 can immediately set the IP tunnel as soon as it recognizes that the query is intended to ST 1 which belongs to AP 1.

Figure 18:
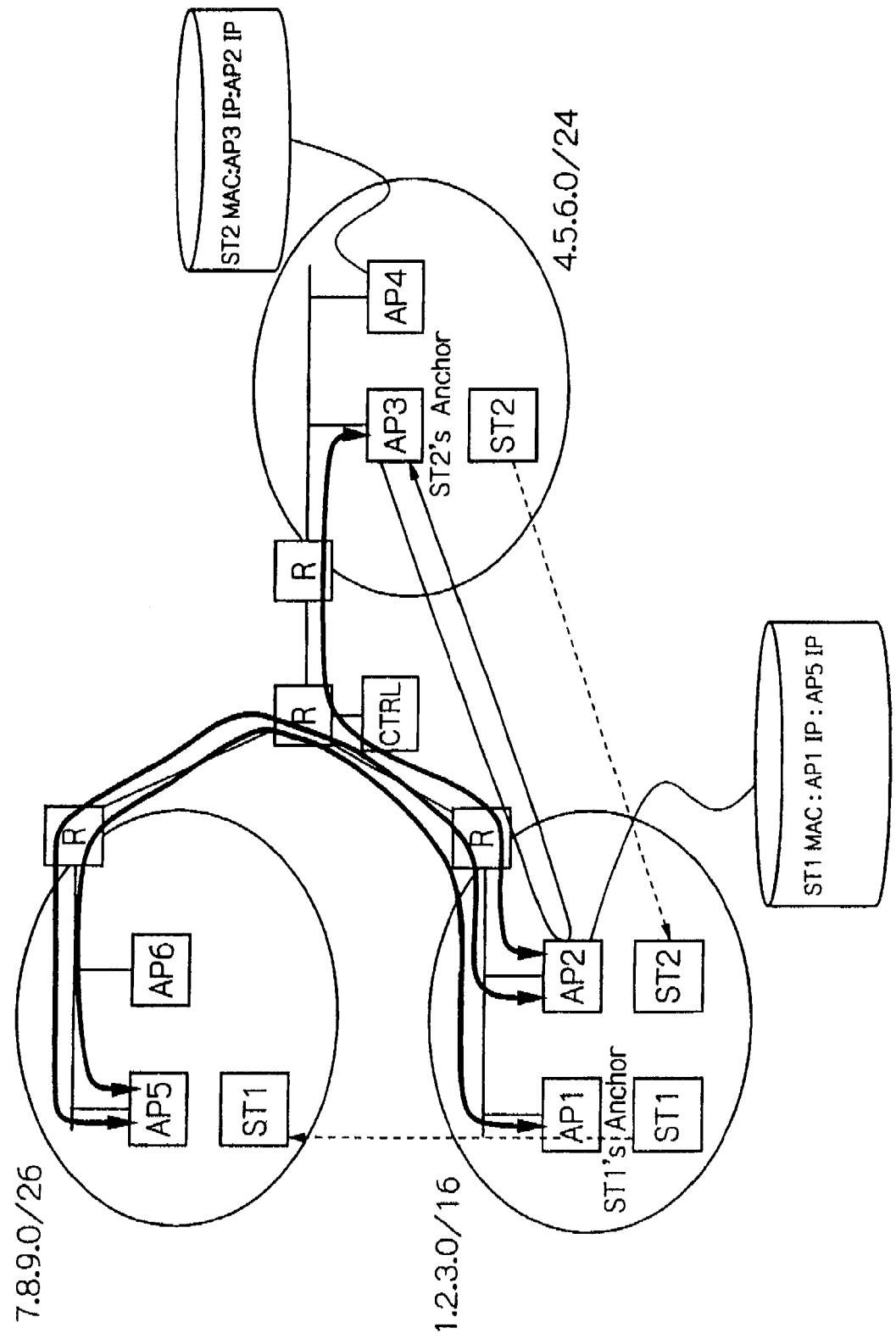
FIG. 18 is a diagram for describing a yet another operation of the specific example illustrated in FIG. 14.

FIG. 18 is a diagram for describing a yet another operation of the specific example illustrated in FIG. 14. As illustrated in FIG. 18, when ST 2 moves from AP 3 to AP 2, and ST 1 moves from AP 1 to AP 5, as indicated by dotted lines, from the initial belonging state of FIG. 14, AP 3 operates as an anchor for ST 2, while AP 1 operates as an anchor for ST 1.

Assume herein that AP 3 starts the optimization process earlier than AP 1 from this state.

AP 3 monitors a transferred frame for the source address to determine whether or not the path optimization is applicable. The source address is within 1.2.3.0/16. Assume herein that AP 3 is previously aware that AP 2 belongs to the sub-net of 1.2.3.0/16.

Accordingly, AP 3 queries AP 2 belonging to the sub-net of 1.2.3.0/16 for AP to which the ST having the source address is connected. AP 2 recognizes from the IP address that the ST is ST 1 which belongs to AP 5 by way of AP 1 which serves as an anchor, and responds to AP 3 to that effect.

AP 3 perceives the location of the source ST, and determines that an IP tunnel can be set between AP 5 and AP 2. Then, AP 3 instructs AP 5 and AP 2 to set an IP tunnel therebetween. When the IP tunnel has been set, communications between ST 1 and ST 2 are directly made through the IP tunnel between AP 2 and AP 5.

Figure 19:
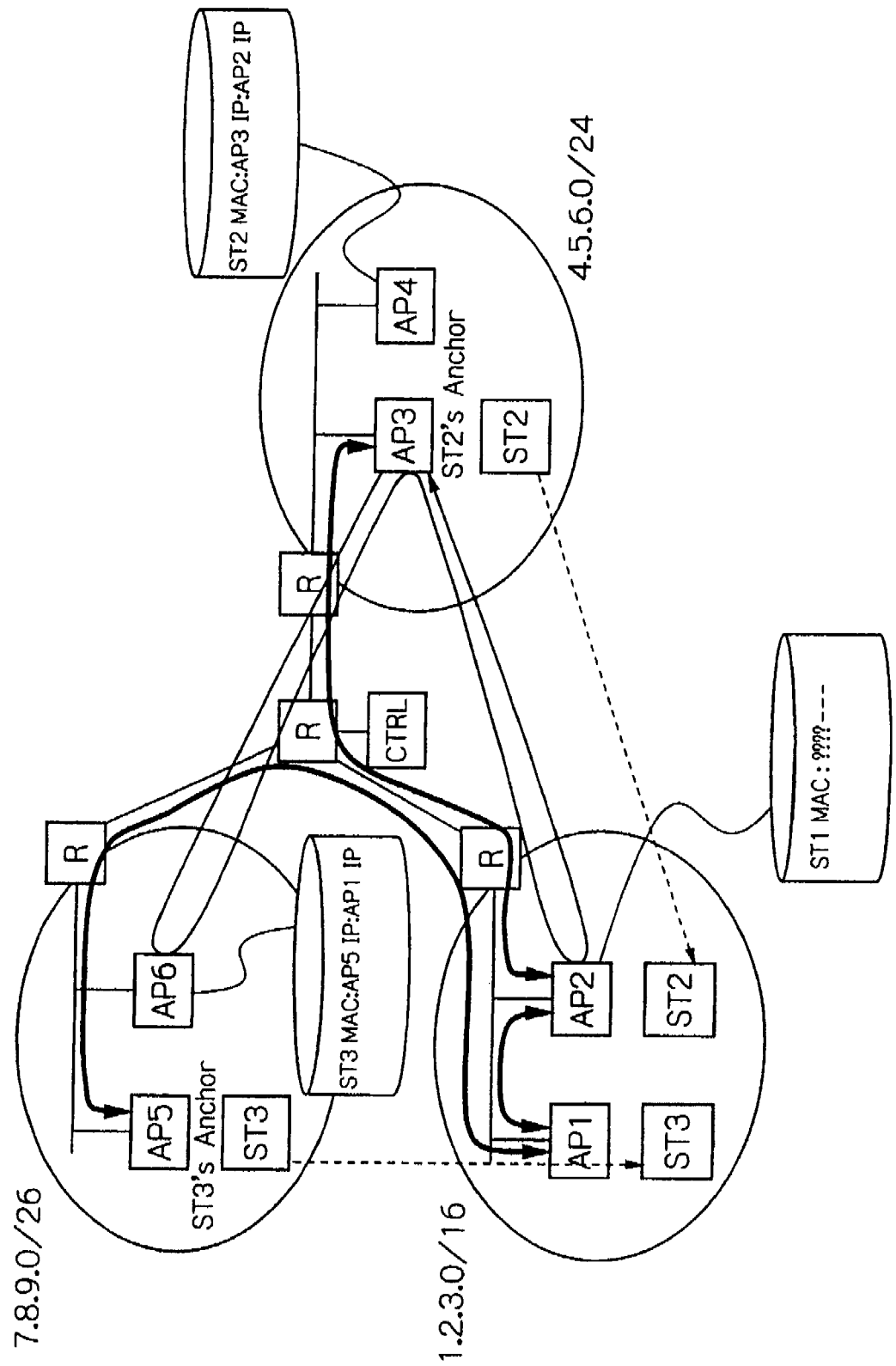
FIG. 19 is a diagram for describing the operation of another specific example.

FIG. 19 is a diagram for describing the operation of another specific example. As illustrated in FIG. 19, when ST 2 moves to AP 2, and ST 3 moves to AP 1, as indicated by dotted lines, from an initial belonging state where ST 2 belongs to AP 3, and ST 3 belongs to AP 5, AP 3 operates as an anchor for ST 2, while AP 5 operates as an anchor for ST 3.

When ST 3 communicates with ST 2 in this state, all communications pass through AP 5 and AP 3 which serve as anchors.

Then, AP 3 which serves as an anchor starts the optimization process from this state.

AP 3 monitors a transferred frame for the source address to determine whether or not the path optimization is applicable. The source address is within 7.8.9.0/26. Assume herein that AP 3 is previously aware that AP 6 belongs to the sub-net of 7.8.9.0/26.

Accordingly, AP 3 queries AP 6 belonging to the sub-net of 7.8.9.0/26 for AP to which the ST having the source address is connected. AP 6 finds the MAC address from the IP address of the ST through ARP, recognizes that the ST is ST 3 which belongs to AP 1, and responds to AP 3 to that effect.

AP 3 perceives the location of the source ST, and determines that an IP tunnel can be set between AP 1 and AP 2. Then, AP 3 instructs AP 2 and AP 1 to set an IP tunnel therebetween. When the IP tunnel has been set, communications between ST 1 and ST 2 are directly made through the IP tunnel between AP 1 and AP 2.

As described above, according to this embodiment, in the path optimization process, AP which assumes a position of an anchor reads the address of a packet of ST which passes over a communication path temporarily established by the anchor function when the ST moves, and queries AP in another sub-net indicated by the address to determine the location of a counterpart ST to optimize the path, thus making it possible to continue the communication even if the ST moves, and to prevent a concentrated traffic load and an increased delay time. In addition, the path optimization process will not either cause an increase in load on CTRL.

(Third Embodiment)

In the first embodiment, CTRL manages the ST belonging information, while in the second embodiment, each AP manages the ST belonging information, but the present invention is not limited to them. As another example, a third embodiment shows a configuration which eliminates the need for managing the ST belonging information in either CTRL or APs.

The basic configuration of a wireless communications system according to the third embodiment is similar to the first embodiment illustrated in FIG. 4. This embodiment assumes a condition that a counterpart ST which communicates with a moving ST belongs to the same sub-net which includes AP that serves as an anchor. If there is an AP that serves as an anchor on the same sub-net, the AP may send a Internet Control Message Protocol (ICMP) ECHO request only at that time.

In a sub-net which includes AP that serves as an anchor, communications devices (here, server (A) 18) may be connected to other APs. The path optimization is applicable when the source of packets which transfers them as an anchor is AP in the same sub-net, whereas the path optimization cannot be applied when the source is server (A) 18 or the like which is not related to the wireless communications system.

As such, the AP which serves as an anchor determines whether or not the path optimization is applicable by checking that a counterpart is located in the same sub-net and is an AP which belongs to the same wireless communications system.

Figure 20:
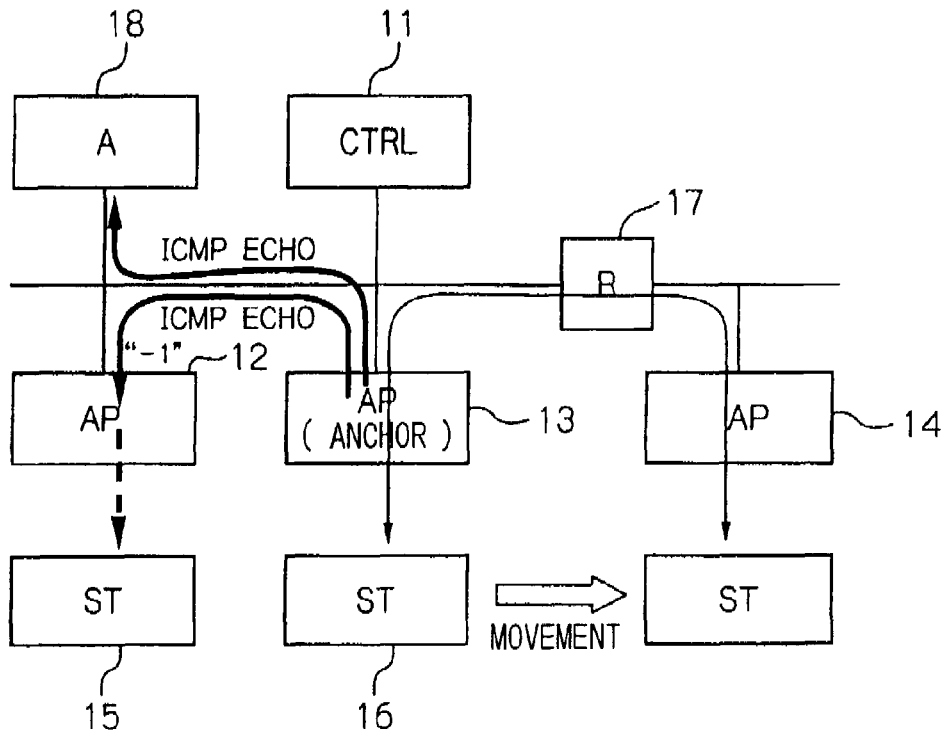
FIG. 20 is a diagram for describing operations for determining whether or not the path optimization is applicable in a third embodiment.

FIG. 20 is a diagram for describing operations for determining whether or not the path optimization is applicable in the third embodiment.

The AP in the wireless communications system in this embodiment decrements the value of a TTL (Time To Live) field by one when an IP packet is transferred to a wireless side. This enables a determination to be made as to whether or not an AP of interest is an AP in the same sub-net within the wireless communications system from a response to an ICMP ECHO request which has the value of TTL set to "1."

Since the value of TTL is decremented by one to result in zero if an ICMP ECHO request is sent to the AP in the wireless communications system, an ICMP Time Exceeded error is returned. It can be determined that the source of the packet is AP in the wireless communications system when this error is returned. On the other hand, it can be determined that the source of the packet is another communications device when an ICMP ECHO response is returned.

Accordingly, AP which serves as an anchor for certain ST transmits an ICMP ECHO request having the value of TTL set to "1" to a counterpart of the ST for determining whether or not the counterpart is ST which is connected to another AP within the wireless communications system.

When the counterpart is ST connected to AP, this AP decrements the value of the TTL field by one, so that the ICMP Time Exceeded error is returned to the AP which serves as an anchor. It is determined from the returned ICMP Time Exceeded error that the path optimization is applicable.

In FIG. 20, AP 13 which serves as an anchor sends the ICMP ECHO request having the value of TTL set to "1" to counterparts of ST 16 which has moved to AP 14. In FIG. 20, the counterparts are server (A) 18 and ST 15 connected to AP 12.

For ST 15, AP 12 decrements the value of TTL by one, so that an ICMP Time Exceeded error is returned to AP 13. In other words, the path optimization is applicable. On the other hand, for server (A) 18, an ICMP ECHO response is returned to AP 13. In other words, the path optimization cannot be applied.

Figure 21:
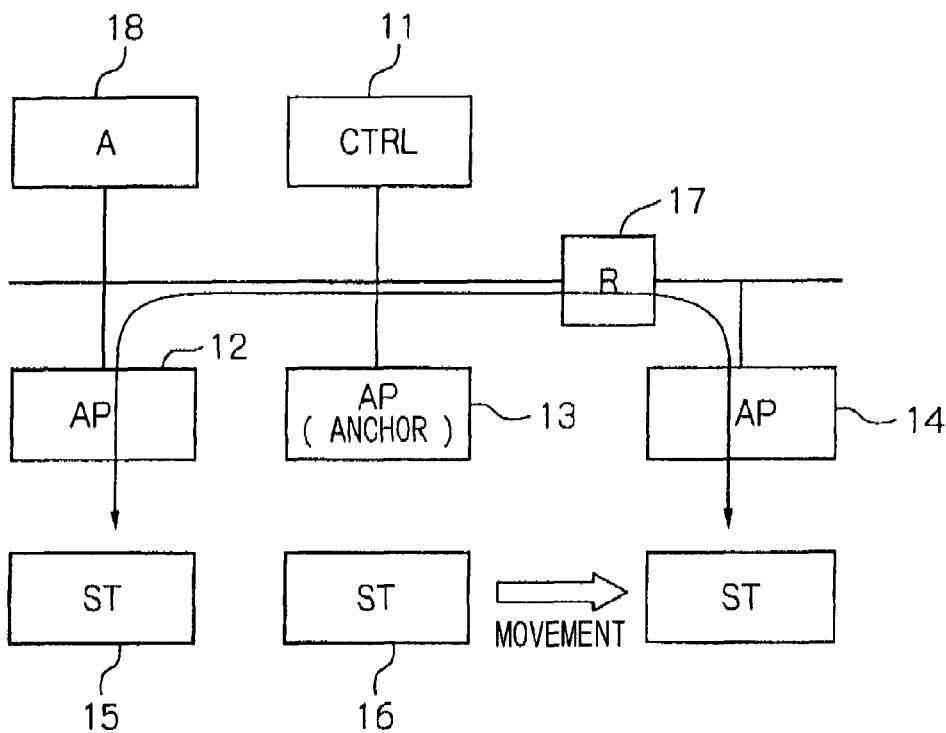
FIG. 21 is a diagram for describing operations for the path optimization in the third embodiment.

FIG. 21 is a diagram for describing the operation of the path optimization in the third embodiment. Upon determining that the path optimization is applicable, AP 13 instructs AP 12 and AP 14 to set an IP tunnel therebetween. After the IP tunnel has been set between AP 12 and AP 14 in response to the instruction, communications between ST 15 and ST 16 are made over an optimal path which directly connects AP 12 with AP 14 without intervention of AP 13.

Figure 22:
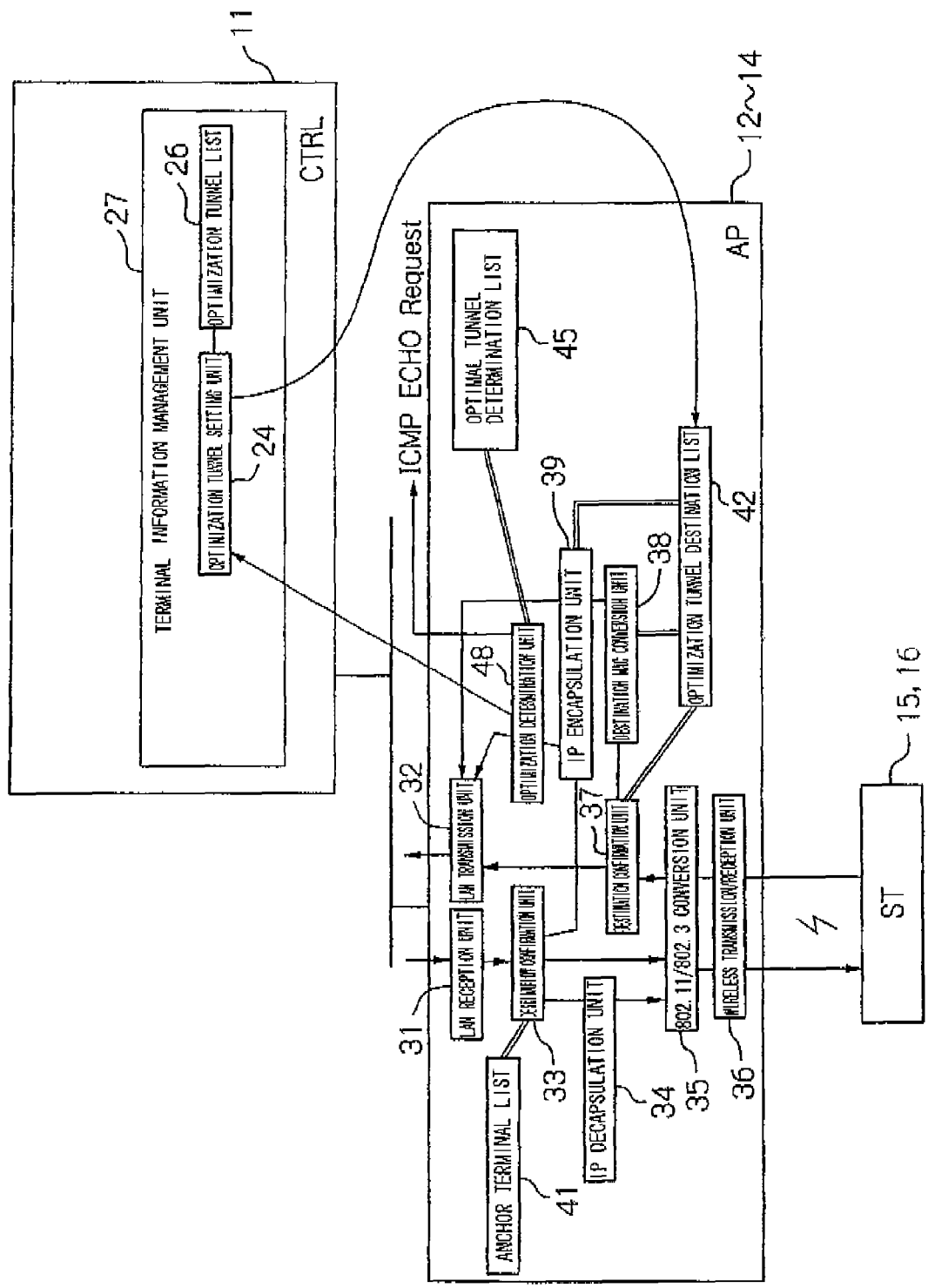
FIG. 22 is a block diagram illustrating the configuration of CTRL and AP in the third embodiment.

FIG. 22 is a block diagram illustrating the configuration of CTRL and AP in the third embodiment.

Referring to FIG. 22, CTRL 11 comprises terminal information management unit 27. Terminal information management unit 27 has optimization tunnel setting unit 24. While handover processing unit 21 is omitted in FIG. 22, CTRL 11 may or may not comprise handover processing unit 21. When CTRL 11 does not comprise handover processing unit 21, APs 12-14 mutually implement a handover to create anchor terminal 41.

Each of APs 12-14 comprises LAN reception unit 31, LAN transmission unit 32, destination confirmation unit 33, IP decapsulation unit 34, 802.11/802.3 conversion unit 35, wireless transmission/reception unit 36, destination confirmation unit 37, destination MAC conversion unit 38, IP encapsulation unit 39, and optimization determination unit 48.

In CTRL 11, optimization tunnel setting unit 24 optimizes a path which is determined by optimization determination unit 48 of AP 12-AP 14 that it can be optimized. Upon receipt of an instruction from AP 12-14 to optimize the path, optimization tunnel setting unit 24 sets an IP tunnel through which both APs, to which STs are connected, are directly connected without intervention of the anchor. Each AP 12-14 records the destination of the set IP tunnel in optimization tunnel destination list 42. Also, optimization tunnel setting unit 24 itself records information on the IP tunnel in optimization tunnel list 26 after it has set the IP tunnel for optimizing the path.

On the other hand, in each AP 12-14, LAN reception unit 31 is connected to a wired LAN to receive data therefrom. LAN transmission unit 32 is connected to the wired LAN to transmit data thereto.

Destination confirmation unit 33 confirms destinations of packets received by LAN reception unit 31 and distributes the packets in accordance with the destinations. In this event, when a received packet is destined to ST which is connected to the AP itself, destination confirmation unit 33 sends the packet to 802.11/802.3 conversion unit 35. The processing for decrementing TTL of ICMP ECHO by one may be performed in destination confirmation unit 33, by way of example. In this event, upon confirmation that a received packet is destined to ST which is connected to the AP itself, destination confirmation unit 33 decrements TTL of the packet by one. On the other hand, when a packet is destined to ST connected to another AP by way of the AP itself which serves as an anchor, destination confirmation unit 33 sends the packet to LAN transmission unit 32 through IP encapsulation unit 39 and optimization determination unit 48. In this event, destination confirmation unit 33 can confirm the anchor connected ST by referencing anchor terminal list 41. Further, when a packet is associated with an IP tunnel for the optimization, destination confirmation unit 33 sends the packet to IP decapsulation unit 34.

IP decapsulation unit 34 decapsulates an IP-encapsulated packet and sends the decapsulated packet to 802.11/802.3 conversion unit 35.

802.11/802.3 conversion unit 35 converts an 802.3 frame from destination confirmation unit 33 or IP decapsulation unit 35 to an 802.11 frame which is sent to wireless transmission/reception unit 36, and converts an 802.11 frame from wireless transmission/reception unit 36 to an 802.3 frame which is sent to destination confirmation unit 37.

Wireless transmission/reception unit 36 transmits/receives 802.11 frames to/from ST through a wireless channel.

Destination confirmation unit 37 confirms destinations of packets from 802.11/802.3 conversion unit 35, and distributes the packets in accordance with the destinations. In this event, destination confirmation unit 37 determines packets to be IP-encapsulated, for which a communication path has been optimized, by referencing optimization tunnel destination list 42. Then, destination confirmation unit 37 sends the packets to be IP-encapsulated to destination MAC conversion unit 38, and sends the remaining packets to LAN transmission unit 32.

Destination MAC conversion unit 38 converts the MAC address of a packet from destination confirmation unit 37 with reference to optimization tunnel destination list 42. Since the packet from destination confirmation unit 37 has an IP address destined to ST for which an IP tunnel is set, and a MAC address set to a default gateway, destination MAC conversion unit 38 converts the MAC address to be destined to the same ST as the IP address.

IP encapsulation unit 39 IP-encapsulates a packet, the MAC address of which has been converted by destination MAC conversion unit 38, for an optimized path. Then, IP encapsulation unit 39 sends the packet which has been IP-encapsulated for the optimization to LAN transmission unit 32. This IP encapsulation permits the packet to be directly sent to the counterpart AP of the IP tunnel.

Also, for a path which is connected by way of an anchor and is not optimized, IP encapsulation unit 39 IP-encapsulates a packet which is transferred through an IP tunnel between AP which serves as the anchor and AP to which ST is actually connected. Then, IP encapsulation unit 39 sends packets which have been IP-encapsulated for anchor connection to optimization determination unit 48.

Optimization determination unit 48 determines whether or not the optimization is applicable to a path of packets from IP encapsulation unit 39. In this event, optimization determination unit 48 sends an ICMP ECHO request with TTL=1 to a counterpart device of the anchor connected ST. When an ICMP Time Exceeded error is returned in response, optimization termination unit 48 determines that the optimization is applicable.

Upon determining that the optimization is applicable, optimization determination unit 48 requests CTRL 11 to perform the optimization. On the other hand, upon determining that the optimization cannot be applied, optimization determination unit 48 may record the determination result in optimization tunnel determination list 45. In doing so, optimization determination unit 48 can recognize a path which was determined in the past that the optimization could not be applied thereto by referencing optimization tunnel determination list 45. Subsequently, optimization determination unit 48 may not determine again as to those paths which were determined in the past that the optimization could not be applied thereto, but may determine as to only those paths which were not determined in the past that the optimization could not be applied thereto. In this way, it is possible to omit wasteful determination processing.

Figure 23:
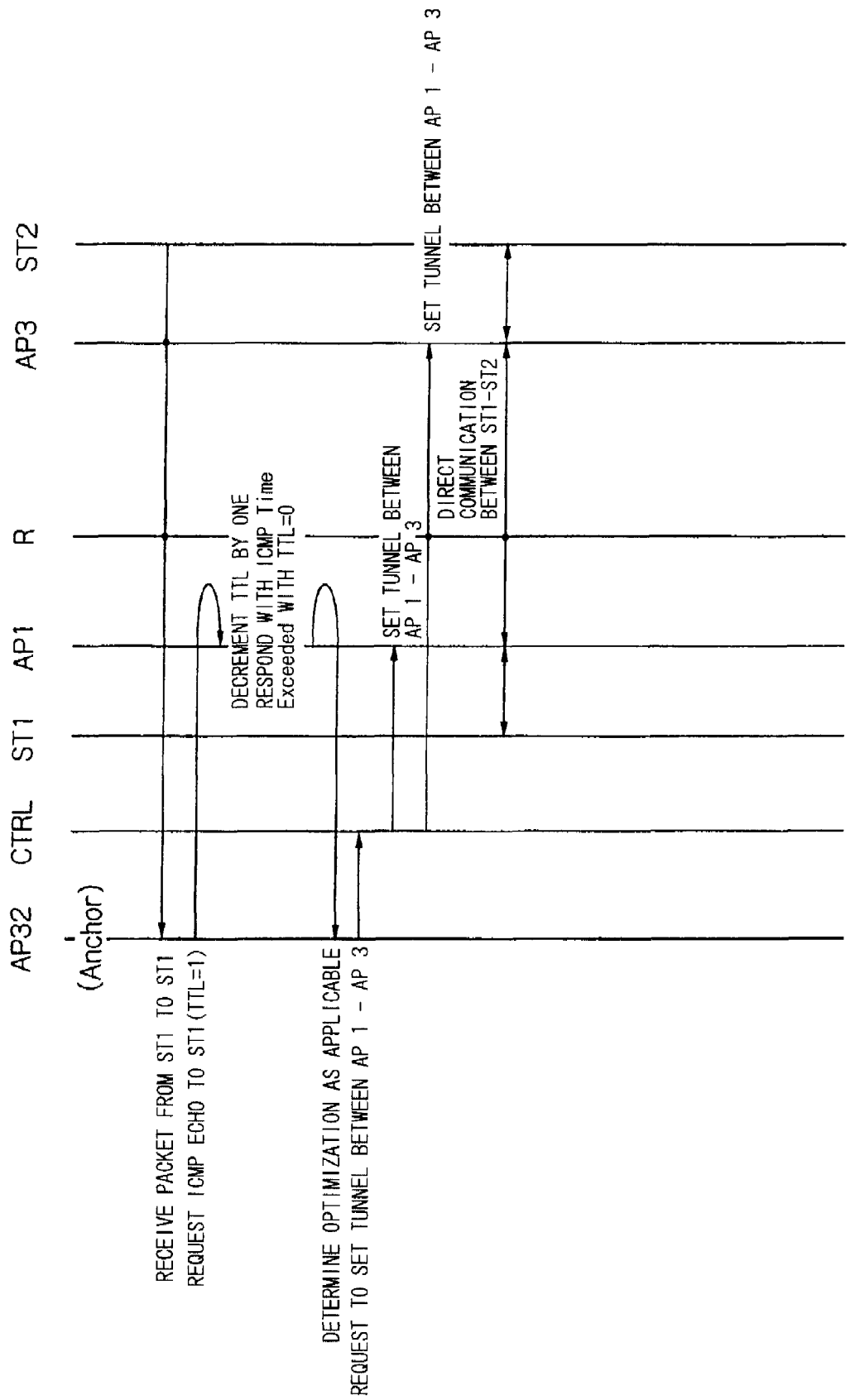
FIG. 23 is a sequence diagram illustrating operations for the path optimization.

FIG. 23 is a sequence diagram illustrating operations for the path optimization process. Assume in FIG. 23 that ST 1 is connected to AP 1, while ST 2 is connected to AP 3 by way of AP 2 which serves as an anchor. Packets from ST 2 to ST 1 are sent from AP 3 to AP 1 to which ST 1 is connected, by way of AP 2 which is an anchor. Then, the packets from ST 2 are sent from AP 1 to ST 1.

AP 2 which serves as an anchor transmits an ICMP ECHO request which has TTL set to "1" and destined to ST 1 from this state. AP 1 decrements the TTL by one to result in TTL equal to zero. Consequently, a Time Exceeded error is returned from AP 1 to AP 2.

In this way, AP 2 determines that the path optimization is applicable, and instructs CTRL to set an IP tunnel between AP 1 and AP 3. In response to the instruction, CTRL requests AP 1 and AP 3 to set an IP tunnel therebetween.

As AP 1 and AP 3 have set the IP tunnel, ST 1 connected to AP 1 and ST 2 connected to AP 3 directly communicate without intervention of AP 2 which serves as an anchor. The path optimization is performed in the foregoing manner.

According to this embodiment, it can be readily determined, without using the ST belonging information, whether or not the path optimization is applicable, on condition that a counterpart ST which communicates with a moving ST belongs to the same sub-net as AP which serves as an anchor, thus making it possible to continue the communication even if the ST moves, and to prevent a concentrated traffic load and an increased delay time.

While preferred embodiments of the present invention have been described using specific terms, such description is for illustrative purposes only, and it is to be understood that changes and variations may be made without departing from the spirit or scope of the following claims.

What is claimed is:

1. A wireless communications system having a plurality of wireless base stations located such that a mobile wireless terminal can be connected thereto, wherein said wireless terminal is allowed to continue a communication when said wireless terminal moves between wireless base stations by transmitting/receiving data between a source base station which assumes a position of an anchor and a destination base station, said wireless communications system comprising:
> a controller for managing a connection of said wireless terminal to a wireless base station, and providing a source base station with information for connecting said wireless terminal by way of the anchor when said wireless terminal moves between wireless base stations; and
> said plurality of wireless base stations each for notifying a list of wireless terminals connected thereto to mutually share the list and for switching a path such that data is transmitted/received between wireless base stations to which wireless terminals are connected on both sides of an anchor connected communication without intervention of the anchor when it is determined based on said list that optimization of the path is applicable.

2. The wireless communications system according to claim 1, wherein said wireless base station switches a path such that data is transmitted/received between the wireless base stations to which the wireless terminals are connected on both sides without intervention of the anchor when the wireless base stations, to which the wireless terminals are connected, are included in said same wireless communications system.

3. The wireless communications system according to claim 2, wherein said wireless base station requests said controller for a path optimization when said wireless base station assumes a position of the source base station to make an anchor connection in response to a movement of the wireless terminal, and
> said controller determines that the path optimization is applicable when a counterpart of said wireless terminal connected by way of the anchor by said wireless base station which requests for the path optimization is a wireless terminal connected to a counterpart wireless base station in said same wireless communications system, and instructs a destination base station and the counterpart wireless base station to switch a path.

4. The wireless communications system according to claim 2, wherein said wireless base station determines that the path optimization can be applied when said wireless base station assumes a position of the source base station to make an anchor connection in response to a movement of the wireless terminal, if a counterpart of said wireless terminal is a wireless terminal connected to a counterpart wireless base station in said same wireless communications system, and instructs said controller to optimize the path, and
> said controller instructs a destination base station and the counterpart wireless base station to switch the path upon receipt of a path optimization instruction from said wireless base station.

5. The wireless communications system according to claim 2, wherein said wireless base station determines that the path optimization can be applied when said wireless base station assumes a position of the source base station to make an anchor connection in response to a movement of the wireless terminal, if the counterpart of said wireless terminal is a wireless terminal connected to a counterpart wireless base station in said same wireless communications system, and instructs a destination base station and the counterpart wireless base station to switch the path.

6. The wireless communications system according to claim 4, wherein said wireless base stations notify the list of wireless terminals connected thereto to mutually share the list within a same LAN, and
> each of said wireless base stations determine whether or not the counterpart of said wireless terminal is a wireless terminal connected to the counterpart wireless base station in said same wireless communications system by querying any wireless base station within the LAN in which the counterpart exists, when said wireless base station assumes the position of the source base station to make the anchor connection in response to the movement of said wireless terminal.

7. The wireless communications system according to claim 5, wherein said wireless base stations notify the list of wireless terminals connected thereto to mutually share the list within a same LAN, and
> each of said wireless base stations determine whether or not the counterpart of said wireless terminal is a wireless terminal connected to the counterpart wireless base station in said same wireless communications system by querying any wireless base station within the LAN in which the counterpart exists, when said wireless base station assumes the position of the source base station to make the anchor connection in response to the movement of said wireless terminal.

8. The wireless communications system according to claim 4, wherein said wireless base station decrements a Time to Live (TTL) value by one in a packet when said packet is transferred to a wireless terminal connected to said wireless base station itself over a wireless channel, and
> when said wireless base station assumes the position of a source base station to make the anchor connection in response to the movement of the wireless terminal which has been connected to said wireless base station to communicate with a counterpart within a same LAN, said wireless base station determines whether or not said counterpart is a wireless terminal connected to a counterpart wireless base station in said same wireless communications system based on a response to an Internet Control Message Protocol (ICMP) ECHO request sent to said counterpart with the TTL value being set equal to "1".

9. The wireless communications system according to claim 5, wherein said wireless base station decrements a Time to Live (TTL) value by one in a packet when said packet is transferred to a wireless terminal connected to said wireless base station itself over a wireless channel, and
> when said wireless base station assumes the position of a source base station to make the anchor connection in response to the movement of the wireless terminal which has been connected to said wireless base station to communicate with a counterpart within a same LAN, said wireless base station determines whether or not said counterpart is a wireless terminal connected to a counterpart wireless base station in said same wireless communications system based on a response to an Internet Control Message Protocol (ICMP) ECHO request sent to said counterpart with the TTL value being set equal to "1".

10. The wireless communications system according to claim 1, wherein at least one of said wireless base stations encapsulates a packet between said wireless terminal and a counterpart wireless terminal thereof to directly transmit/receive the encapsulated packet between said source base station and said counterpart base station.

11. The wireless communications system according to claim 10, wherein said at least one wireless base station converts a MAC address of the packet between said mobile wireless terminal and the counterpart wireless terminal thereof to a value indicative of the respective counterpart wireless terminal, and thereafter encapsulates the packet to directly transmit the encapsulated packet to the respective counterpart wireless base station.

12. The wireless communications system according to claim 3, wherein said wireless base station holds a list of past determination results in regard to applicability of the path optimization, and determines that the path optimization is not applicable to a path which is designated as path optimization not applicable in the list without again making the determination.

13. A wireless base station installed such that a mobile wireless terminal can be connected thereto, wherein said wireless base station is included in a wireless communication system having a plurality of wireless base stations, each of the wireless base stations notifying a list of wireless terminals connected thereto to mutually share the list, and the wireless base station allows said mobile wireless terminal to continue a communication by transmitting/receiving data between a source which assumes a position of an anchor and a destination when said mobile wireless terminal moves, said wireless base station comprising:
- a determination module for determining, based on the list received from the plurality of the wireless base stations, whether or not an optimization is applicable to a path between wireless terminals on both sides of an anchor connected communication; and
- a path switching module for switching the path such that data is transmitted/received between wireless base stations to which said wireless terminals on both sides are connected without intervention of the anchor, when the path optimization is determined to be applicable based on the list.

14. The wireless base station according to claim 13, wherein said determination module determines that the path optimization is applicable when the wireless base stations, to which the wireless terminals are connected, are included in said same wireless communications system.

15. The wireless base station according to claim 14, wherein said determination module determines that the path optimization is applicable if a counterpart of said mobile wireless terminal is a wireless terminal connected to a counterpart wireless base station in said same wireless communications system, when said wireless base station assumes a position of a source base station to make an anchor connection in response to a movement of said mobile wireless terminal, and instructs destination base station and the counterpart wireless base station to switch a path, and
- said path switching module switches the path in response to an instruction from the source base station when said wireless base station assumes a position of a destination base station or a counterpart base station.

16. The wireless base station according to claim 15, wherein said determination module notifies a list of wireless terminals connected thereto to mutually share the list within a same LAN, and determines whether or not the counterpart of said mobile wireless terminal is a wireless terminal connected to a counterpart wireless base station in said same wireless communications system by querying any wireless base station within the LAN in which the counterpart exists, when said wireless base station assumes the position of the source base station to make the anchor connection in response to the movement of said wireless terminal.

17. The wireless base station according to claim 15, further comprising:
- a processing module for decrementing a Time to Live (TTL) value by one in a packet when the packet is transferred to a wireless terminal connected to said wireless base station over a wireless channel,
- wherein when said wireless base station assumes the position of the source base station to make the anchor connection in response to the movement of the wireless terminal which has been connected to said wireless base station to communicate with a counterpart within the same LAN, said determination module determines whether or not said counterpart is a wireless terminal connected to a wireless base station in said same wireless communications system based on a response to an ICMP ECHO request sent to said counterpart with the TTL value being set equal to "1".

18. The wireless base station according to claim 13, wherein said path switching module encapsulates a packet between said mobile wireless terminal and a counterpart wireless terminal thereof to transmit/receive the encapsulated packet directly between said wireless base stations to which said wireless terminals on both sides are connected without intervention of the anchor.

19. The wireless base station according to claim 18, further comprising:
- a destination MAC conversion module for converting a MAC address of a packet between said mobile wireless terminal and said counterpart wireless terminal to a value indicative of said counterpart wireless terminal, and providing the packet to said path switching module,
- wherein said path switching module encapsulates the packet provided thereto from said destination MAC conversion module to directly transmit the encapsulated packet to a counterpart wireless base station to which the counterpart wireless terminal is connected.

20. The wireless base station according to claim 13, wherein said wireless base station holds a list of past determination results in regard to applicability of the path optimization, and determines that the path optimization is not applicable to a path which is designated as path optimization not applicable in the list without again making the determination.

21. In a wireless communications system having a plurality of wireless base stations located such that a mobile wireless terminal can be connected thereto, wherein said wireless terminal is allowed to continue a communication when said wireless terminal moves between wireless base stations by transmitting/receiving data between a source base station which assumes a position of an anchor and a destination base station, a wireless communication controller for managing said plurality of said wireless base stations and for receiving from said plurality of said wireless base stations a list of wireless terminals connected thereto, the wireless communication controller comprising:
- a determination module for receiving a request for path optimization from a wireless base station which assumes a position of a source base station to make an anchor connection in response to a movement of a wireless terminal, and determining, based on the list received from the plurality of the wireless base stations, whether or not the path optimization is applicable to a path between said mobile wireless terminal and a counterpart wireless terminal thereof; and
- a tunnel setting module for instructing a destination wireless base station of said wireless terminal and a wireless base station of said counterpart wireless terminal to switch the path to transmit/receive data without intervention of the anchor when said determination module determines that the path optimization is applicable based on the list.

22. The wireless communication controller according to claim 21, wherein said determination module determines that the path optimization is applicable when the counterpart of said mobile wireless terminal is a wireless terminal connected to a wireless base station in said same wireless communications system.

23. In a wireless communications system having a plurality of wireless base stations located such that a mobile wireless terminal can be connected thereto, wherein said wireless terminal is allowed to continue a communication when said wireless terminal moves between wireless base stations by transmitting/receiving data between a source base station which assumes a position of an anchor and a destination base station, a non-transitory computer program product having stored thereon a program which when executed causes a computer to implement functions for managing a plurality of said wireless terminals, said functions comprising:
- a procedure for receiving, from the plurality of the wireless base stations, a list of wireless terminals connected thereto;
- a procedure for receiving a request for path optimization from a wireless base station which assumes a position of a source base station to make an anchor connection in response to a movement of a wireless terminal, and determining, based on the list received from the plurality of the base stations, whether or not the path optimization is applicable to a path between said mobile wireless terminal and a counterpart wireless terminal thereof; and
- a procedure for instructing a destination wireless base station of said wireless terminal and a wireless base station of said counterpart wireless terminal to switch the path to transmit/receive data without intervention of the anchor when said determination module determines that the path optimization is applicable based on the list.

24. The non-transitory computer program product according to claim 23, wherein the path optimization is determined to be applicable when the counterpart of said mobile wireless terminal is a wireless terminal connected to a wireless base station in said same wireless communications system.

25. A path control method in a wireless communications system having a plurality of wireless base stations installed such that a mobile wireless terminal can be connected thereto, wherein said wireless terminal is allowed to continue a communication when said wireless terminal moves between wireless base stations by transmitting/receiving data between a source base station which assumes a position of an anchor and a destination base station, said path control method comprising:
- receiving, from the plurality of the wireless base stations, a list of wireless terminals connected thereto;
- determining, based on the list received from the plurality of the base stations, whether or not a path optimization is applicable to a path between wireless terminals on both sides of an anchor connected communication; and
- switching the path such that data is transmitted/received between wireless base stations to which said wireless terminals on both sides are connected without intervention of the anchor in response to determining that the path optimization is applicable based on the list.

26. The path control method according to claim 25, further comprising:
- determining that the path optimization is applicable when the wireless base stations, to which the wireless terminals are connected, are included in said same wireless communications system.

27. A wireless communication system for optimizing a communication path between wireless terminals, the wireless communication system comprising:
- at least three wireless base stations, a first wireless base station and a second wireless base station among the at least three wireless base stations connected to a first sub-net, and a third wireless base station among the at least three wireless base stations connected to a second sub-net, the first sub-net and the second sub-net connected via a router;
- at least two wireless terminals, a first wireless terminal and a second wireless terminal among the at least two wireless terminals located in the first sub-net, the first wireless terminal connected to the first base station and the second wireless terminal connected to the second base station; and
- a controller for optimizing communication paths between at least two wireless terminals, wherein in response to the second wireless terminal moving from the first sub-net to the second sub-net, the second wireless terminal is connected to the third wireless base station, and the second wireless base station assumes a position of an anchor between the first wireless base station and the third wireless base station to set a first path which facilitates communication between the first wireless terminal and the second wireless terminal via the first wireless base station and the third wireless base station,
- wherein the second wireless base station, in response to assuming the position of the anchor, transmits a request to the controller to optimize the first path between the first wireless terminal and the second wireless terminal, the at least three wireless base stations sharing a list of wireless terminals connected thereto with the controller, and
- the controller, in response to receiving the request from the second wireless base station and based on the list received from the at least three wireless base stations, determines whether the first path can be optimized, and in response to determining that the first path can be optimized, the controller switches the first path to a second path which connects the first wireless base station to the third wireless base station for exchanging data between the first wireless base station and the third wireless base station without intervention of the anchor.

* * * * *

UNITED STATES PATENT AND TRADEMARK OFFICE
CERTIFICATE OF CORRECTION

PATENT NO. : 8,681,735 B2  
APPLICATION NO. : 11/681842  
DATED : March 25, 2014  
INVENTOR(S) : Yasuhiro Mizukoshi, Sadao Kimura and Hideki Kurokawa It is certified that error appears in the above-identified patent and that said Letters Patent is hereby corrected as shown below:

In the Specification

Column 1, Line 34: Delete "907." and insert -- 906. --

Signed and Sealed this
Twenty-first Day of October, 2014

Michelle K. Lee
*Deputy Director of the United States Patent and Trademark Office*